(12) United States Patent
Kaltenbach

(10) Patent No.: US 9,541,180 B2
(45) Date of Patent: Jan. 10, 2017

(54) HYBRID DRIVE HAVING AN AUTOMATED CONVENTIONAL GEARBOX

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 786 days.

(21) Appl. No.: 13/806,630

(22) PCT Filed: May 5, 2011

(86) PCT No.: PCT/EP2011/057170
§ 371 (c)(1),
(2), (4) Date: Apr. 11, 2013

(87) PCT Pub. No.: WO2012/000705
PCT Pub. Date: Jan. 5, 2012

(65) Prior Publication Data
US 2013/0186233 A1    Jul. 25, 2013

(30) Foreign Application Priority Data

Jun. 28, 2010 (DE) .......................... 10 2010 030 573

(51) Int. Cl.
*F16H 3/089* (2006.01)
*B60K 6/442* (2007.10)
(Continued)

(52) U.S. Cl.
CPC .............. *F16H 37/065* (2013.01); *B60K 6/442* (2013.01); *B60K 6/48* (2013.01); *B60K 6/547* (2013.01);
(Continued)

(58) Field of Classification Search
CPC  F16H 3/006; F16H 37/042; F16H 2003/0807;
F16H 2003/0931; F16H 2003/0933; F16H 3/126; B60K 6/36; B60K 6/48; B60K 6/387; B60K 6/44; B60K 2006/4825; B60K 2006/4841
(Continued)

(56) References Cited

U.S. PATENT DOCUMENTS 6,941,830 B2 *  9/2005 Ibamoto et al. ................ 74/339
8,661,941 B2 *  3/2014 Hellenbroich et al. ......... 74/661
(Continued)

FOREIGN PATENT DOCUMENTS

DE     101 36 725 A1    2/2002
DE     101 43 289 A1    3/2003
(Continued)

OTHER PUBLICATIONS

International Search Report and Written Opinion mailed Jul. 27, 2011 in International Application No. PCT/EP2011/057170, English and German languages (13 pp.).

*Primary Examiner* — William Kelleher
*Assistant Examiner* — Jude Agendia
(74) *Attorney, Agent, or Firm* — Brinks Gilson & Lione

(57) ABSTRACT

A hybrid drive for a motor vehicle comprising a first transmission input shaft for connecting to a first internal combustion engine, a second transmission input shaft, which is coaxial to the first transmission input shaft and connects to a first electric motor, a layshaft, a first gear shifting device connecting the first transmission input shaft and the second transmission input shaft in a first shifting setting and engaging a gear in a second shifting setting, and a transmission output shaft.

20 Claims, 18 Drawing Sheets

Figure 1:
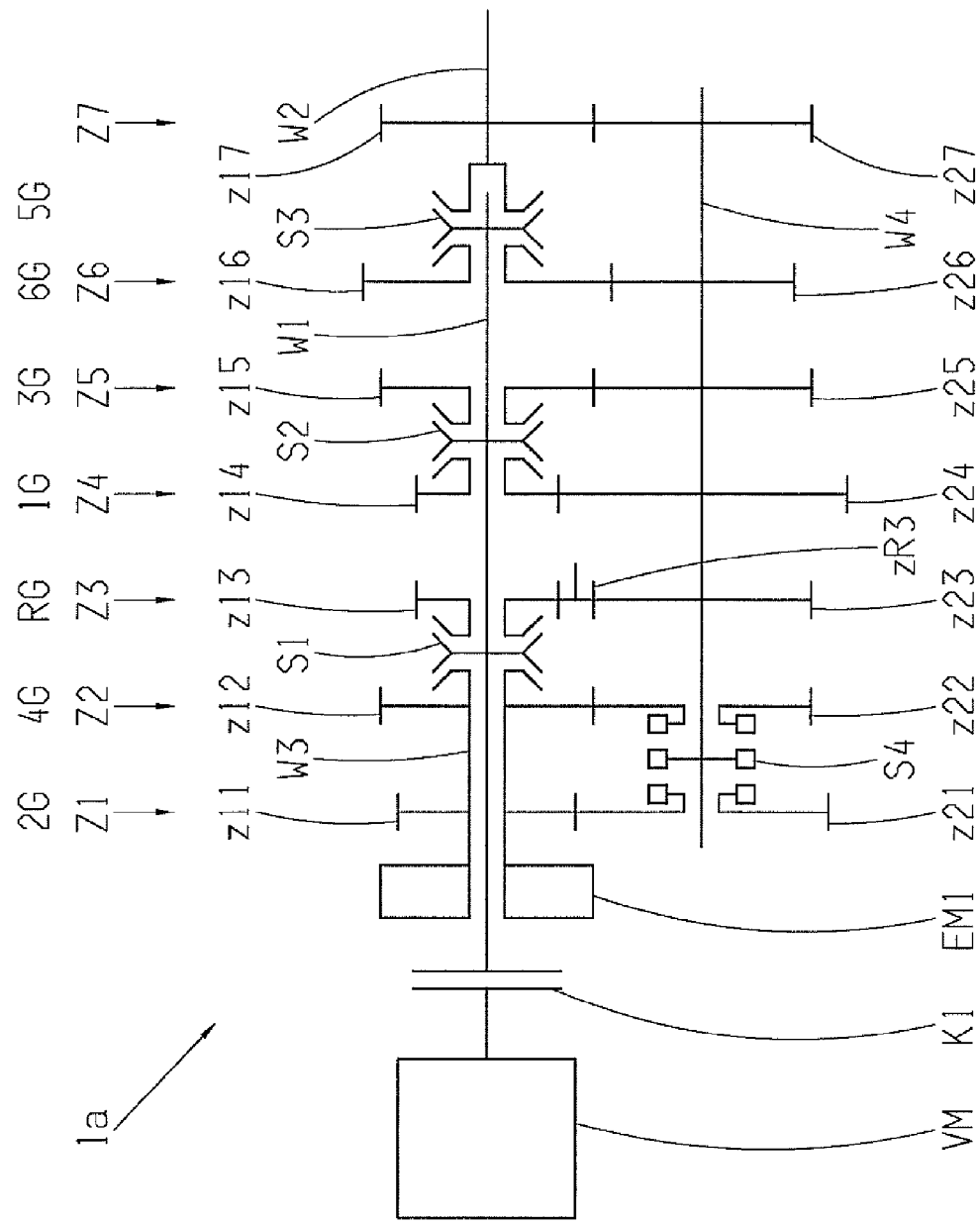

(51) Int. Cl.

| | | |
|---|---|---|
| *B60K 6/48* | (2007.10) | |
| *B60K 6/547* | (2007.10) | |
| *F16H 37/06* | (2006.01) | |
| *F16H 3/091* | (2006.01) | |
| *F16H 3/12* | (2006.01) | |
| *B60K 6/54* | (2007.10) | |
| *F16H 3/00* | (2006.01) | |
| *F16H 61/04* | (2006.01) | |

(52) U.S. Cl.
CPC ............ *F16H 3/089* (2013.01); *F16H 3/0915* (2013.01); *F16H 3/126* (2013.01); *B60K 2006/4808* (2013.01); *B60K 2006/4841* (2013.01); *B60K 2006/541* (2013.01); *F16H 2003/007* (2013.01); *F16H 2061/0422* (2013.01); *F16H 2061/0433* (2013.01); *F16H 2200/0047* (2013.01); *F16H 2200/0052* (2013.01); *Y02T 10/626* (2013.01); *Y02T 10/6221* (2013.01); *Y02T 10/6234* (2013.01); *Y10S 903/902* (2013.01); *Y10T 74/19014* (2015.01)

(58) Field of Classification Search
USPC ................ 74/330, 331, 333, 661; 180/65.21, 180/65.225, 65.24; 903/902, 906
See application file for complete search history.

(56) References Cited

U.S. PATENT DOCUMENTS

| | | | | |
|---|---|---|---|---|
| 8,771,139 | B2 * | 7/2014 | Ideshio | ................. B60K 6/365 477/14 |
| 2002/0033059 | A1 * | 3/2002 | Pels et al. | ........................ 74/329 |
| 2006/0021456 | A1 * | 2/2006 | Hughes | ........................... 74/340 |
| 2007/0022835 | A1 | 2/2007 | Kilian et al. | |
| 2009/0176617 | A1 * | 7/2009 | Dilzer | ................ 477/5 |
| 2010/0006357 | A1 * | 1/2010 | Oba et al. | ................. 180/65.25 |
| 2010/0120580 | A1 * | 5/2010 | Mepham et al. | ................. 477/3 |
| 2012/0065016 | A1 * | 3/2012 | Tamai et al. | ..................... 475/5 |

FOREIGN PATENT DOCUMENTS

| | | | |
|---|---|---|---|
| DE | 10 2006 036 758 A1 | 2/2008 | |
| DE | 102006036758 * | 2/2008 | .............. F16H 3/08 |
| EP | 2 368 739 A1 | 9/2011 | |
| WO | WO 2010/070707 A1 | 6/2010 | |

* cited by examiner

| Gangfolge VM | i | Sprung | S1 | S2 | S3 | S4 | Gangfolge EM |
|---|---|---|---|---|---|---|---|
| 1 (Z4) | 4.75 |  | li | li |  | li | 2 separat |
| 2 (Z1) | 3.19 | 1.49 |  |  |  | li | 2 gekoppelt |
| 3 (Z5) | 2.16 | 1.48 |  | re |  | li | 2 separat |
| 3 (Z5) | 2.16 | 1.48 | li | re |  | re | 4 separat |
| 4 (Z2) | 1.44 | 1.50 |  |  | re | re | 4 gekoppelt |
| 5 Direktgang | 1.00 | 1.44 |  |  | li | re | 4 separat |
| 6 (Z6) | 0.67 | 1.48 |  |  |  | re | 4 separat |
| R (Z3) | −5.40 |  | re |  |  | li | 2 separat (rückwärtsdrehend) |

Spreizung 7.05

1a

Fig. 2

| Gangfolge VM | S1 | S2 | S3 | Gangfolge EM |
|---|---|---|---|---|
| 1 | re | | li | 2 separat |
| 2 | li | | li | 2 gekoppelt |
| 3 | | li | li | 2 separat |
| 3 | | li | re | 4 separat |
| 4 | li | | re | 4 gekoppelt |
| 5 | | re | re | 4 separat |
| R_elektrisch | | | li | 2 (EM rückwärtsdrehend) |

1e

Fig. 8

| Gangfolge VM | S1 | S2 | S3 | Gangfolge EM |
|---|---|---|---|---|
| 1 | li | | li | 1 gekoppelt |
| 2 | re | | li | 1 separat |
| 3 | | li | li | 1 separat |
| 3 | | li | re | 4 separat |
| 4 | li | | re | 4 gekoppelt |
| 5 | | re | re | 4 separat |
| R_elektrisch | | | li | 1 (EM rückwärtsdrehend) |

Fig. 11

| Gangfolge VM | S1 | S2 | Gangfolge EM |
|---|---|---|---|
| 0 | li |  | 0 (ggf. Batterie laden ohne Kraftfluss zum Abtrieb) |
| 0 |  | li | 1 (rein elektrisches Anfahren) |
| 1 | li | li | 1 gekoppelt |
| 2 | re | li | 1 separat |
| 2 | re | re | 3 separat |
| 3 | li | re | 3 gekoppelt |
| R_elektrisch |  | li | 1 (EM rückwärtsdrehend) |

Fig. 13

| Gangfolge VM | S1 | S2 | Gangfolge EM |
|---|---|---|---|
| 0 | | li | 1 (serieller Betrieb für stop-and-go) |
| 1 | li | li | 1 gekoppelt |
| 2 | re | li | 1 separat |
| 2 | re | re | 3 separat |
| 3 | li | re | 3 gekoppelt |
| R_elektrisch | | li | 1 (EM rückwärtsdrehend) |

HYBRID DRIVE HAVING AN AUTOMATED CONVENTIONAL GEARBOX

This application is a filing under 35 U.S.C. §371 of International Patent Application PCT/EP2011/057170, filed May 5, 2011, and claims the priority of DE 10 201 0 030 573.1, filed Jun. 28, 2010. These applications are incorporated by reference herein in their entirety.

The invention relates to a hybrid drive having an automated conventional transmission according to the preamble of claim 1.

Vehicles are increasingly equipped with hybrid drives, i.e., with two or more different power sources. Drives of this type can contribute, in particular in road traffic, to a reduction in fuel consumption and exhaust emissions. The aim of the development is hybrid drive trains, built to be as compact as possible, which can be implemented in vehicles in a manner that is as uncomplicated as possible, and with the lowest possible expenditures in terms of costs and construction. As a result, drive trains having an internal combustion engine and one or more electric motors have substantially prevailed as parallel hybrids or as mixed hybrids, because they enable both an overlapping of the drive torques and operation with just an internal combustion engine drive or just an electric motor drive, due to a substantially parallel configuration of the internal combustion engine and the electric motor in the force flow. Because the drive torque of the electric drive and the internal combustion engine can be combined, depending on the mode of operation, a comparably smaller design of the internal combustion engine and/or a periodic deactivation thereof is possible, by means of which a significant reduction of the $CO_2$ emissions without appreciable losses in performance or comfort can be obtained. The possibilities and advantages of an electric drive can thus be combined with the range of travel, performance, and cost benefits of internal combustion engines.

As other hybrid drives, serial hybrids should be mentioned, with which an internal combustion engine serves as a generator, which supplies an electric motor such that the internal combustion engine is disengaged from the drive wheels and therefore can be permanently operated at a single, emissions favorable operating point. In this case, however, the efficiency of the drive is limited due to the mechanical-electrical multiple conversions, and the numerous operational possibilities of a parallel hybrid or a mixed form are not available thereto.

In order to obtain the most effective operation of the hybrid, drive strategies are implemented which make use of the electric drive in a flexible manner, depending on the circumstances, for example for starting, as the sole power source in urban short range traffic, or in stop-and-go mode, as a supplementary power source when demands to power are greater in a boost mode, as a starter generator for quick starting of the internal combustion engine, and as a generator for generating current or for energy recycling during a recuperation mode. The internal combustion engine, however, should be operated at least substantially, at consumption, torque, and rotational rate favorable operation points, with a high degree of efficiency.

Fundamentally, hybrid drives can be combined with all conventional forms of vehicle transmissions for forming drive transmissions. As particularly advantageous, parallel hybrid configurations having an internal combustion engine and an electric drive in connection with an automated conventional transmission, referred to in short as AMT hybrids, have proven themselves with regard to efficiency, cost effectiveness, and driving comfort.

The electric drive in a drive train of this type can be integrated in the force flow in a variety of ways. In a typical construction, an electric motor is disposed at the transmission input. For this, a distinction is made between a single clutch configuration (1K) and a double clutch configuration (2K), or, if an integrated starter generator function (ISG) of the electric motor is provided, between a 1K-ISG configuration and a 2K-ISG configuration.

With a 2K-ISG configuration, the electric motor is disposed directly on a transmission input shaft, which can be connected to an internal combustion engine by means of a first clutch, which can be designed as a frictionally engaged or, as the case may be, a form-locking decoupler. The electric motor can be coupled to a transmission by means of a separate second clutch. An additional second electric motor can also be disposed between the second clutch and the transmission. With a 1K-ISG configuration, only one coupling is provided between an internal combustion engine and an electric motor. A second, separate clutch is dispensed with, or its function is taken over, if applicable, by a shifting clutch located inside the transmission.

Instead of a direct configuration between the internal combustion engine and the vehicle transmission, the electric motor can be functionally connected to the transmission input by means of a gear stage or a planetary gearing. By this means, the electric motor can be implemented, particularly as an electrodynamic start-up element (EDA), as a result of which, a conventional start-up clutch can be dispensed with. With other drive trains, the electric drive is disposed, instead, at the transmission output, or directly on a vehicle axle with axle hybrids. 1K-ISG and 2K-ISG hybrid concepts having electric motors at the transmission input or at the transmission output, and axle hybrids, have already proven themselves in the field.

Hybrid drives, however, have the disadvantage that, with those in which the electric drive is permanently connected to the transmission input or the transmission output, i.e., those which are integrated in the force flow of the drive train, unnecessary zero load losses may occur via the electric motor. In addition, the operational possibilities, depending on the configuration of the electric drive and the drive train configuration, differ, and are limited. In particular, hybrid concepts having an electric drive, which is functionally connected to a transmission input of a conventional transmission structure, do not allow for driving power support during the shifting of gears actuated by the internal combustion engine.

With hybrid concepts having an electric drive, which is functionally connected to a transmission output or a direct axle drive, the start-up of the internal combustion engine and the operation of the electric motor when the vehicle is at a standstill, as well as the use of various gear ratios by the electric motor, however, is not possible.

In contrast to this, hybrid configurations are striven for in which an electric drive can be entirely disengaged from the force flow, or selectively engaged thereto, respectively, at least for individual gear stages. These hybrid configurations fundamentally have the potential of a greater degree of variability with the conception of a gearwheel set, in particular for an AMT hybrid, because structural limitations due to a mechanical connection between the internal combustion engine and the electric drive can at least be minimized.

A transmission concept of this type has a variety of advantages with, for example, so-called plug-in hybrid vehicles or with so-called mechanically enhanced range extender electric vehicles, which are vehicles in which the electric drive is designed such that it provides enough power by itself for short range operation, for example, in city traffic.

On one hand, with internal combustion engine shifting procedures, i.e., shifting gears, during which the internal combustion engine is the power source for the vehicle, a substantial driving power can be obtained supplemented by the electric drive. Conversely, the driving power can be maintained during a gear shifting of the electric drive, when supplemented by the internal combustion engine, if the internal combustion engine is not currently shut off. On the other hand, the shifting points for electric shiftings can fundamentally be selected in a very flexible manner, due to the usually available larger rotational rate range, in comparison to an internal combustion engine, when functioning well. The shifting times that can be obtained also enable the use of relatively cost-effective shifting actuating elements.

The shifting procedures can be synchronized by means of the internal combustion engine via a friction clutch, if applicable, acting between the internal combustion engine and the transmission input, such that at least in part, synchronization devices can be replaced by means of less expensive jaw clutch couplings. On the other hand, a start-up clutch, if available, can be used to a lesser degree, in that the electric motor serves as a start-up element. Because an electric motor can be operated, as a rule, in both rotational directions by means of reversing the direction of rotation, it is possible to dispense with a separate reverse gear set. In addition, gear ratio progressions of the internal combustion engine gears are selected to be comparatively large in a hybrid system of this type, as a result of which, a relatively low number of gears is sufficient for implementing a given overall range. As a result, costs, structural size and weight can be reduced.

WO 2008/138387 A1 shows an AMT hybrid of this type, having gears driven by means of an internal combustion engine, and gears driven by means of an electric motor. Shifting procedures, free of interruptions to the driving power as well as a variable functionality of the electric drive are implemented with the known hybrid drive system through the use of two sub-transmissions. The transmission structure substantially comprises two sub-drive trains, in a parallel axle configuration, each having an input shaft and an output drive train disposed between them, having an output shaft, wherein there are two idler gears in each plane in numerous gear set planes on the shafts, to each of which a clutch is dedicated, and a fixed gear is disposed.

The sub-input drive trains form, collectively with the output drive train, in each case, a sub-transmission having gear shifting gearwheel pairs, wherein the respective gearwheel disposed on the output shaft engages, on the one hand, with a gearwheel on the first input shaft, and on the other hand, with a gearwheel on the second input shaft, selectively, depending on the gear selected, thus participating in a gear ratio of the first sub-transmission or the second sub-transmission.

The first sub-transmission can be connected to an internal combustion engine by means of a friction clutch; the second sub-transmission is permanently functionally connected to an electric motor. A change in the coupling to the output shaft between the first and second input shafts results by means of shifting from shifting gearwheel pairs, wherein some of the gears may be represented through shifting to a single gearwheel pair in the force flow from one of the input shafts to the output shaft, and other gears may be represented through successive shiftings of two or more gearwheel pairs, alternating between the one input shaft and the other input shaft, to the output shaft.

Furthermore, DE 101 33 695 A1 discloses an AMT hybrid having two input shafts and two input-side clutches, preferably in a double-clutch construction. The two input shafts each form a sub-transmission with the idler gears and fixed gears disposed thereon, and the shifting devices dedicated thereto. The two sub-transmissions are either designed to be axially parallel, each having an output shaft or an axially parallel drive, or they are disposed in a nested manner, one inside the other, wherein the two input shafts are coaxial to one another in a typical double-clutch construction, and an output shaft is axially disposed behind this. An electric motor engages with one of the two sub-transmissions.

Said electric motor can be disposed at the transmission output, i.e., at which an end of a transmission input shaft opposite a drive unit, for example an internal combustion engine, is disposed, wherein the transmission input shaft can be functionally connected to an input shaft of the drive unit via the associated clutch at the input end. In particular, the electric motor can be disposed in a rotatable manner on a transmission output shaft, and be functionally connected to one of the transmission input shafts via a gear stage. The electric motor, alternatively, can also be disposed such that it is parallel, with respect to the axles, to one of the transmission input shafts, and can be functionally connected to one of the transmission input shafts via a drive mechanism or a gear stage.

Furthermore, various embodiments of a hybrid drive are described in DE 199 60 621 B4, in which two layshafts disposed axially parallel or coaxially to one another, each can be selectively brought into an active connection with a shared output shaft via numerous shiftable gearwheel sets having different ratios. Via a first input constant the first layshaft is in a driving connection with an input shaft, which can be connected by means of a controllable friction clutch to the output shaft of an internal combustion engine. The second layshaft is either connected directly, in a non-rotational manner, to the rotor of an electric motor, or is functionally connected to the rotor of the electric motor via a second input constant. Additionally, a shifting clutch, which can be engaged or disengaged, is provided in each case, by means of which the second layshaft can be brought into a driving connection with the input shaft by means of the second input constant, or the rotor of the electric motor can be coupled to the input shaft. With an engaged clutch, therefore, both layshafts are also in a driving connection to one another via the two input constants.

The known hybrid drives have one or more of the advantages, specified above, of the drive configurations having an electric drive that can be disengaged. The variation possibilities of the sub-transmissions shown therein in the conception of a gear set are, however, rather limited, or at least the transmission structures are in part relatively extensive in terms of construction and costs, or cannot be adapted to a desired overall range and number of gears without further expenditures.

With this background, the invention assumes the objective of proposing a hybrid drive having an automated shifting transmission, having the advantages specified above, or avoiding the disadvantages. Said drive should primarily exhibit a large degree of variability with regard to a gear set concept as well as the distribution and number of electric and internal combustion engine gearings, and furthermore be favorable in terms of construction and cost expenditures, as well as being efficient and comfortable when in operation.

The solution for this objective can be derived from the properties of the independent Claim, while advantageous designs and embodiments of the invention can be derived from the dependent Claims.

The invention acknowledges that to create a hybrid drive train having an automated conventional transmission, an electric motor can be disposed on a transmission input in a shiftable manner, such that a downstream gear set of the transmission can be substantially freely conceived, aside from a clutch mechanism, and the electric motor can be accessed in a multifunctional manner. In this context it is significant if, in a transmission shifting device, two transmission input shafts can be coupled to one another in a non-rotatable manner, one of which can be driven by means of an internal combustion engine, and the other by means of the electric motor. The same transmission shifting device advantageously serves for the shifting of a transmission gearing in a different shifting setting.

Therefore, the invention is based on a hybrid drive having an automated conventional transmission for a motor vehicle, for example, having an internal combustion engine, which is connected in a driving manner to at least one first transmission input shaft, having an electric drive featuring at least one electric motor, which is connected in a driving manner to a second transmission input shaft, having at least one layshaft, having idler gears and fixed gears disposed on numerous gear set planes, having numerous gear shifting devices, and having a transmission output shaft. To attain the stipulated objective, the invention provides that the two transmission input shafts are disposed coaxially to one another, and that a gear shifting device functionally connects the two transmission input shafts to one another in one of its shifting settings, and in another shifting setting, engages a gear setting.

With a relatively low cost and construction expenditure, a high degree of variability in the conception of an AMT hybrid drive, with respect to an intended range of use for a vehicle equipped in this manner, is enabled by means of this configuration, wherein internal combustion engine, electric, and coupled internal combustion engine-electric drive torque transmissions are made selectively available.

According to a first, particularly simple design variation, it is provided that the two transmission input shafts are disposed coaxially as well as axially adjacent to one another, and that the transmission output shaft is disposed such that the axle is parallel to the two transmission input shafts.

In an embodiment development of the hybrid drive it can be provided that the gear shifting device, with which the two transmission input shafts can be functionally coupled, shifts the second transmission gear setting when in its other shifting setting. It is, however, also possible that when in said shifting setting another gear setting can be actuated.

As another characteristic of a hybrid drive of this type, it can be provided that a second shifting device is disposed on the second transmission input shaft or the transmission output shaft, with which the first transmission gearing can be actuated in a first shifting setting, and the third transmission gearing can be actuated in a second shifting setting.

According to a variation of the hybrid drive specified in the introduction, it is provided that a second electric motor is disposed on the first transmission input shaft between the internal combustion engine and the first gear shifting device. This can serve, for example, for the synchronization of shaft rotational rates, if cost-saving simple jaw clutch couplings are used for the transmission shifting devices.

Furthermore, with the transmission it may be provided that an output gearwheel is disposed in a rotationally fixed manner on the transmission output shaft, between the gear set plane for the second gear and a gear set plane for the third gear, which engages with an input gearing to a differential transmission.

A second group of hybrid drive structures has in common that the second transmission input shaft is designed as a hollow shaft, which coaxially encompasses, at least in part, the first transmission input shaft. Both transmission input shafts can be coupled in this case by means of the already specified gear shifting device, which also serves for the shifting to a driving gear when in a different shifting setting.

Furthermore, with this second group of hybrid drive structures it is provided that the electric motor is functionally connected to the second transmission input shaft, which is designed as a hollow shaft, and therefore can be coupled to the transmission input shaft by means of the gear shifting device. Preferably, the rotor of the electric motor is connected in a rotationally fixed manner to the second transmission input shaft, designed as a hollow shaft, by means of which the electric motor radially encompasses, at least in part, the hollow shaft.

With a configuration according to the invention of this type, one idler gear and one fixed gear on the second transmission input shaft, designed as a hollow shaft, are each disposed in a first and a second gear set plane. It is also fundamentally possible that only a fixed gear or an idler gear is disposed on the hollow shaft. A dedication of two gear set planes to the second transmission input shaft, designed as a hollow shaft, with the electric motor enables, however, the shifting to the associated idler gear by means of a gear shifting device that can be actuated from both sides, having a structural space saving, and cost saving effect.

The transmission output is either formed by means of a transmission output shaft disposed axially behind the first transmission input shaft, wherein a transmission constant is disposed at the output end, or the transmission output is formed by means of the layshaft, or a shaft connected thereto, respectively, by means of which an output constant at the output end can be dispensed with.

In particular, the same gear set can be used, fundamentally, for a hybrid drive structure selectively having coaxial inputs and outputs as a standard drive, preferably for the longitudinal installation, or as an axially shorter structural variation, preferably for the front end-transversal installation, with an axially offset output as a result of the discarded output constant. In this manner, a cost savings in the construction and production of various hybrid drives adapted to a respective type of vehicle can be achieved.

The number of gear ratios and the gear sequences can be flexibly designed according to the given overall range and desired torque characteristics. By way of example, a configuration having seven gear set planes for six forward gears and one reverse gear, or a configuration having five gear set planes for four forward gears and one reverse gear may be provided for the standard drive as well as for the front end-transversal installation.

A reverse gear can be installed, selectively, as a separate gear stage, or implemented by means of a reverse of the rotational direction of the electric drive, by means of which a particularly short axial structural length is obtained. For a plug-in hybrid vehicle, in which a purely electric reverse driving may be sufficient in practical terms, a particularly compact structural variation having five gear set planes for five forward gears, without a separate reverse gear, would appear to be very practical.

Depending on the predefined installation space conditions, with the axially offset variation, the internal combustion engine and the electric drive can be disposed at the same end of the transmission, or opposite one another. Moreover, the positioning of the drive connected to a differential gear is possible at both ends of the transmission with the axially offset variation.

Another advantage is that the idler gears and the associated necessary, or provided, gear shifting devices having a fundamentally identical shifting logic can be distributed, substantially freely, on the drive plane and the layshaft plane. It is particularly advantageous, for example, to dispose only idler gears, and no fixed gears, on the first transmission input shaft, such that only relatively small inertia masses need to be synchronized via associated gear shifting devices designed as synchronization devices, which results in a reduction in fuel consumption. If applicable, existing gear shifting devices designed as un-synchronized jaw clutch couplings can be synchronized by means of the electric motor.

The distribution of the gears to the gearwheel pairs or gear set planes and an associated drive connection can fundamentally be freely selected. In particular, the selection of the gears that are to be used for driving is substantially free. In order to be able to maintain the driving power while shifting gears, it makes sense, however, not to allow coupled gears, in which the electric motor and the internal combustion engine function as a drive via the same gearwheel pair, or the same gear set plane, respectively, to follow one another successively, but rather to position an uncoupled gear, i.e., a gear that is to be driven by means of the internal combustion engine or electrically, between two gears. In any case, it would seem to be more advantageous to provide a comparatively large gear transition between two gears driven electrically in establishing the gear ratio range of the transmission.

With a plug-in hybrid, the electric motor can function advantageously as a start-up element for all start-up gears. As a result it is possible to dispose an inexpensive decoupler between the internal combustion engine and the first transmission input shaft. A friction clutch, however, may also be provided, by means of which a stop-and-go operational mode is possible via a slippage actuation of the friction clutch and the internal combustion engine. A reverse gear is preferably implemented electrically, by means of which one gear set plane can be dispensed with and the axial structural length is shortened.

The internal combustion engine can be started directly, by means of the electric motor, while driving, by means of which, however, the driving power is temporarily interrupted. Fundamentally, an additional starter generator can therefore also be disposed, by means of which a jump start of the internal combustion engine by the electric drive is also possible.

With a particularly simple, cost-effective and space saving, transmission structure, it is possible, for example, to provide only three gear set planes for forward gears, which can be shifted by means of two un-synchronized shifting elements, such as jaw clutch couplings, for example. A reverse gear, or a reverse driving operation can be implemented electrically. The internal combustion engine is connected directly, i.e., such that it cannot be shifted, to the first transmission input shaft. A start-up clutch or decoupler can be entirely dispensed with, because the electric motor is sufficient as the sole start-up element. With this so-called 0K-ISG configuration, the internal combustion engine serves only as a purely mechanical range extender and as a synchronization means for the gears via a regulation of the rotational rate.

Furthermore, it may be provided that the electric drive is expanded by a second electric motor. This electric motor can be shifted in series on the first transmission input shaft with the internal combustion engine, and be actuated advantageously as a generator for supplying a vehicle electrical system, or for charging an electric power storage device and/or for starting the internal combustion engine.

The second electric motor is particularly advantageously configured such that it can permanently generate the necessary mid-range electrical power for supplying the first electric motor in an electric stop-and-go operational mode maintained for a longer period of time, such that a temporary serial hybrid mode can be actuated. With this configuration as well, a start-up clutch can be dispensed with, by means of which space and costs can be reduced.

Concrete drive train structures, which make use of the fundamental principle of the invention, can, for example, have the following appearance:

A hybrid drive characterized in that the first transmission input shaft can be connected to the internal combustion engine by means of a start-up clutch, that five gear set planes are provided for forward gears, one gear set plane is provided for a reverse gear, and an output constant is provided, wherein two gear set planes of the forward gears are dedicated to the second transmission input shaft and the remaining forward gear-gear set planes are dedicated to the first transmission input shaft, wherein gear shifting devices designed as synchronization devices are disposed on the first transmission input shaft, and a gear shifting device designed as a jaw clutch coupling is disposed on the layshaft, and that the transmission output shaft is disposed axially behind the transmission input shaft.

A hybrid drive characterized in that the first transmission input shaft can be connected to the internal combustion engine by means of a start-up clutch, that five gear set planes are provided for forward gears, one gear set plane is provided for a reverse gear, and an output constant is provided, wherein two gear set planes of the forward gears are dedicated to the second transmission input shaft, and the remaining forward gear-gear set planes are dedicated to the first transmission input shaft, wherein three gear shifting devices designed as synchronization devices are disposed on the first transmission input shaft, and one gear shifting device designed as a jaw clutch coupling is disposed on the second transmission input shaft, and that the transmission output shaft is disposed axially behind the transmission input shaft.

A hybrid drive characterized in that the first transmission input shaft can be connected to the internal combustion engine by means of a start-up clutch, that five gear set planes are provided for forward gears, one gear set plane is provided for a reverse gear, and an output constant is provided, wherein two gear set planes of the forward gears are dedicated to the second transmission input shaft, and the remaining forward gear-gear set planes are dedicated to the first transmission input shaft, wherein two gear shifting devices designed as synchronization devices are disposed on the first transmission input shaft, and one gear shifting device designed as a jaw clutch coupling, and one gear shifting device designed as a synchronization device are disposed on the layshaft or the second transmission input shaft, and that the transmission output shaft is disposed axially behind the transmission input shaft.

A hybrid drive characterized in that the first transmission input shaft can be connected to the internal combustion engine by means of a start-up clutch, in that four gear set planes are provided for forward gears, one reverse gear is provided by means of an electric motor rotational direction reversal of a forward gear-gear set, and an output constant is provided, wherein two gear set planes are dedicated to the second transmission input shaft, and the remaining forward gear-gear set planes are dedicated to the transmission input shaft, wherein two gear shifting devices designed as synchronization devices are disposed on the first transmission input shaft, and one gear shifting device designed as a jaw clutch coupling is disposed on the layshaft or the second transmission input shaft, and that the transmission output shaft is disposed axially behind the transmission input shaft.

A hybrid drive characterized in that the first transmission input shaft can be connected to the internal combustion engine by means of a start-up clutch, that five gear set planes are provided for forward gears, and one reverse gear is provided by means of an electric motor rotational direction reversal of a forward gear-gear set, wherein two gear set planes are dedicated to the second transmission input shaft and the remaining gear set planes are dedicated to the first transmission input shaft, wherein two gear shifting devices designed as synchronization devices are disposed on the first transmission input shaft and one gear shifting device, designed as a jaw clutch coupling is disposed on the layshaft or the second transmission input shaft, and that the transmission output shaft is disposed such that it is axially parallel to the first transmission input shaft, wherein the layshaft also serves as a transmission output shaft.

A hybrid drive characterized in that the first transmission input shaft can be connected to the internal combustion engine by means of a start-up clutch, that the electric motor and the internal combustion engine are disposed diametrically opposite to one another, that five gear set planes are provided for forward gears, and a reverse gear is provided by means of an electric motor rotational direction reversal of a forward gear-gear set, wherein two gear set planes are dedicated to the second transmission input shaft, and the remaining gear set planes are dedicated to the first transmission input shaft, wherein two gear shifting devices designed as synchronization devices are disposed on the first transmission input shaft, and one gear shifting device designed as a jaw clutch coupling is disposed on the layshaft or the second transmission input shaft, and that the transmission output shaft is disposed such that it is axially parallel to the first transmission input shaft, wherein the layshaft also serves as a transmission output shaft.

A hybrid drive characterized in that the first transmission input shaft is connected directly to the internal combustion engine, that three gear set planes are provided for forward gears, and one reverse gear is provided by means of an electric motor rotational direction reversal of a forward gear-gear set, wherein two gear set planes are dedicated to the second transmission input shaft, and one gear set plane is dedicated to the first transmission input shaft, wherein one gear shifting device designed as a jaw clutch coupling is disposed, in each case, on the transmission input shaft and on the layshaft or second transmission input shaft, and in that the transmission output shaft is disposed such that it is axially parallel to the first transmission input shaft, wherein the layshaft also serves as a transmission output shaft.

A hybrid drive characterized in that the first transmission input shaft is connected directly to the internal combustion engine, that additionally, a second electric motor is disposed on the first transmission input shaft at the end of the transmission that is facing the internal combustion engine, that three gear set planes are provided for forward gears, and one reverse gear is provided by means of an electric motor rotational direction reversal of a forward gear-gear set, wherein two gear set planes are dedicated to the second transmission input shaft, and one gear set is dedicated to the first transmission input shaft, wherein a gear shifting device designed as a jaw clutch coupling is disposed, in each case, on the first transmission input shaft and on the layshaft or second transmission input shaft, and that the transmission output shaft is disposed such that it is axially parallel to the first transmission input shaft, wherein the layshaft also serves as a transmission output shaft.

A hybrid drive characterized in that the first transmission input shaft is connected directly to the internal combustion engine, that additionally, a second electric motor is disposed on the first transmission input shaft on the end of the transmission diametrically opposite the internal combustion engine, that three gear set planes are provided for forward gears, and one reverse gear is provided by means of an electric motor rotational direction reversal of a forward gear-gear set, wherein two gear set planes are dedicated to the second transmission input shaft, and one gear set plane is dedicated to the first transmission input shaft, wherein a gear shifting device designed as a jaw clutch coupling is disposed, in each case, on the first transmission input shaft and on the layshaft or second transmission input shaft, and that the transmission output shaft is disposed such that it is axially parallel to the first transmission input shaft, wherein the layshaft also serves as a transmission output shaft.

A hybrid drive characterized in that the first transmission input shaft is connected directly to the internal combustion engine, that additionally, a second electric motor is disposed on the first transmission input shaft on the end of the transmission facing the internal combustion engine, that the first electric motor and the internal combustion engine are disposed diametrically opposite to one another, that three gear set planes are provided for forward gears and a reverse gear is provided by means of an electric motor rotational direction reversal of a forward gear-gear set, wherein two gear set planes are dedicated to the second transmission input shaft, and one gear set plane is dedicated to the first transmission input shaft, wherein a gear shifting device designed as a jaw clutch coupling is disposed, in each case, on the first transmission input shaft and on the layshaft or second transmission input shaft, and that the transmission output shaft is disposed such that it is axially parallel to the first transmission input shaft, wherein the layshaft also serves as a transmission output shaft.

The embodiments specified only represent examples of the invention. The person skilled in the art could discover other AMT hybrids by means of reasonable combinations of the disclosed characteristics, which make use of the fundamental principle.

Figure 3:
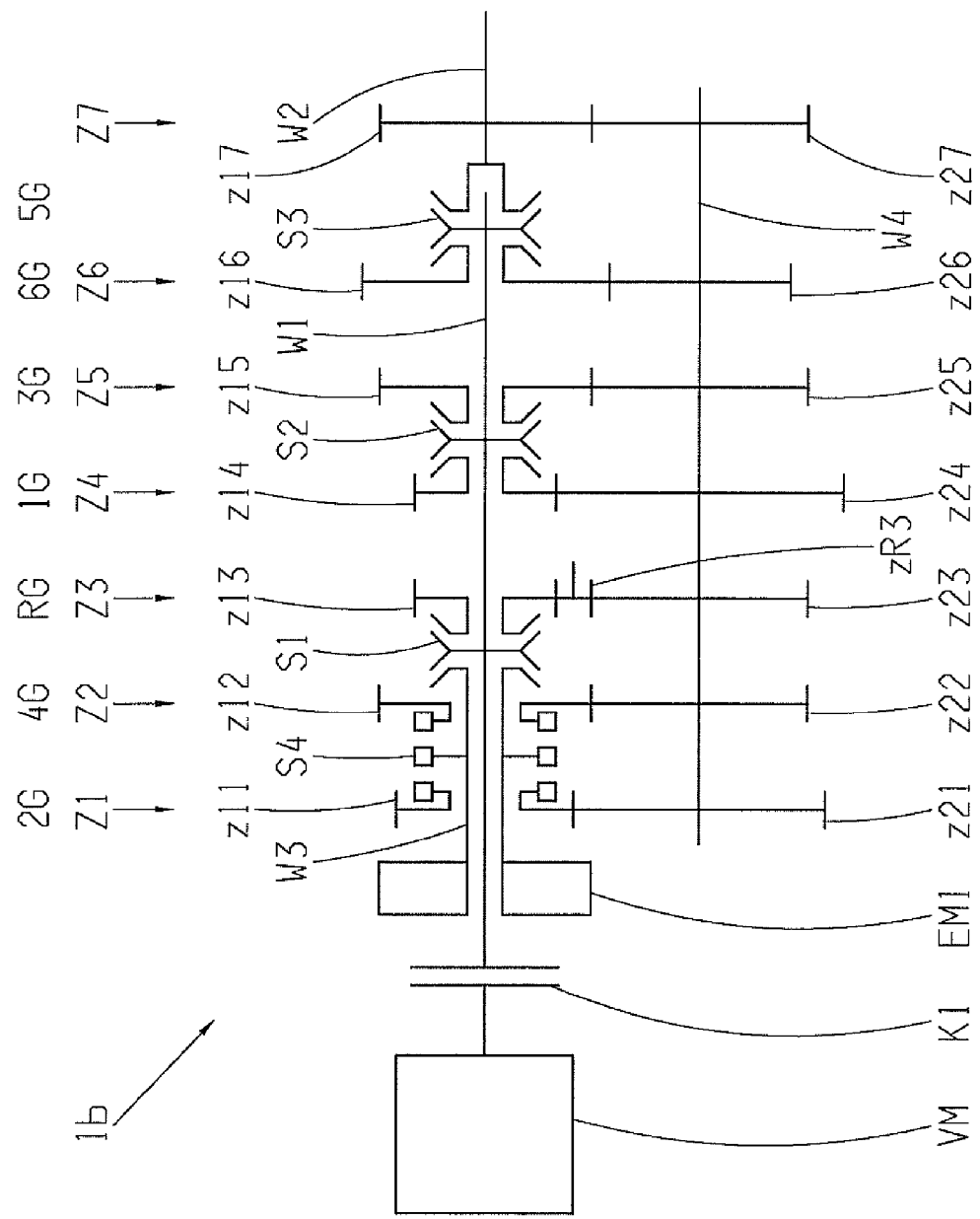
Figure 4:
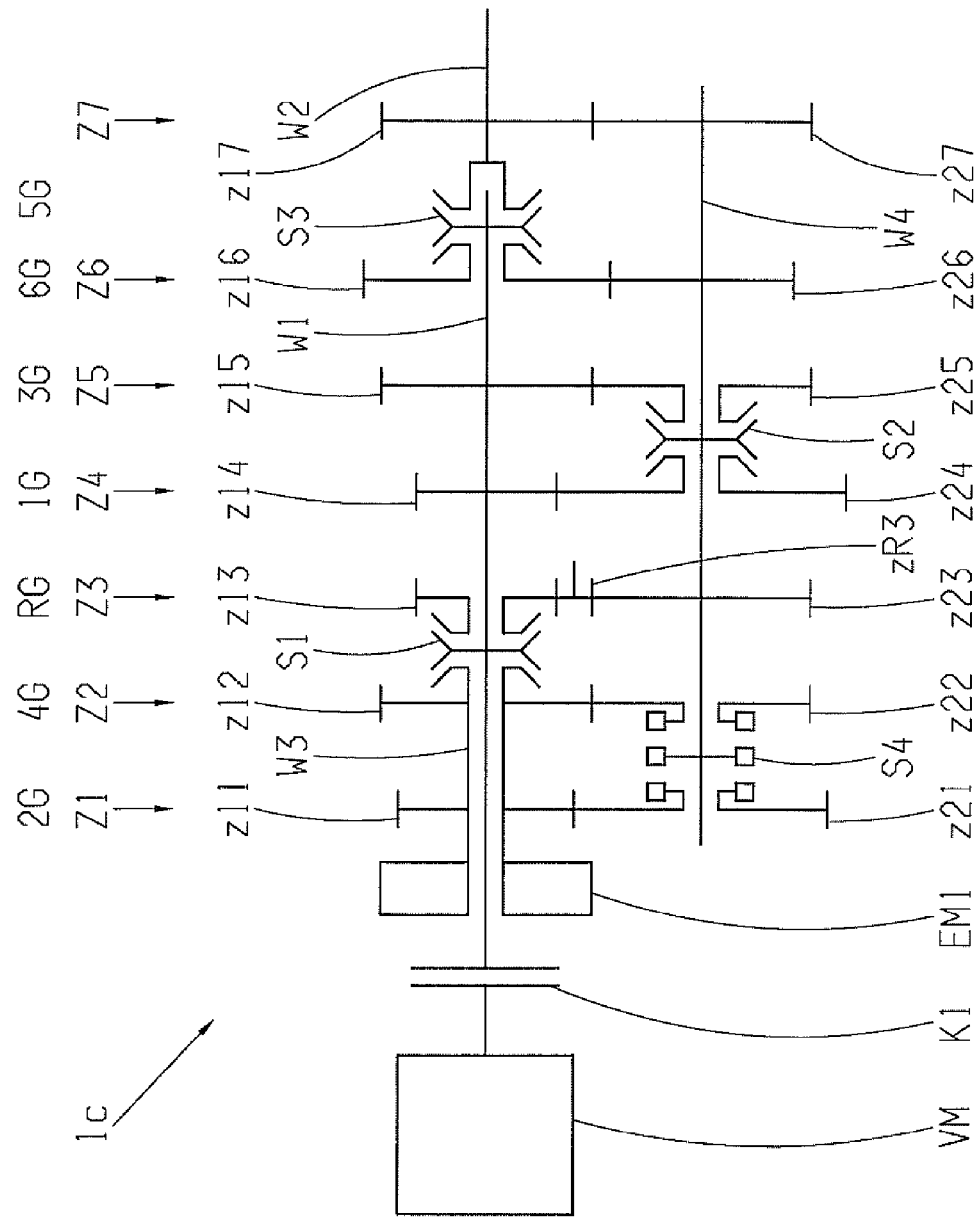
Figure 5:
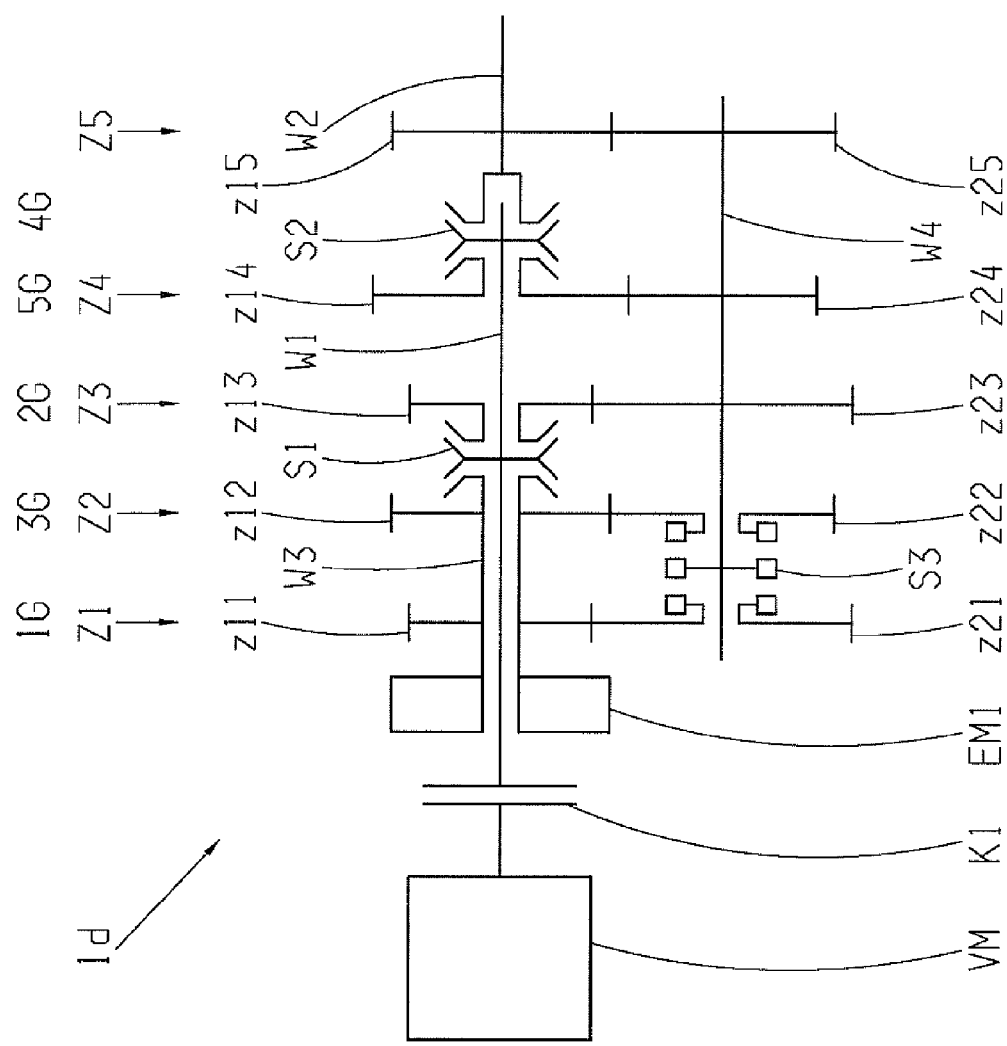
Figure 6:
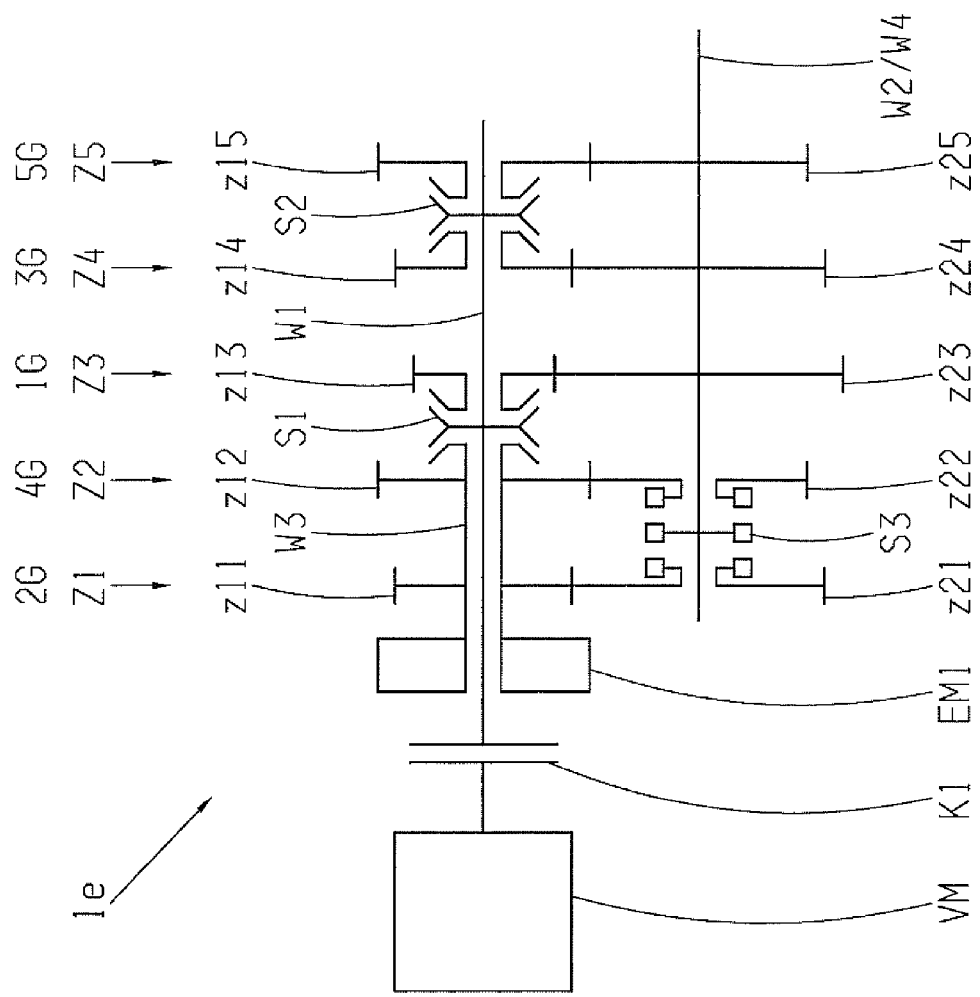
Figure 7:
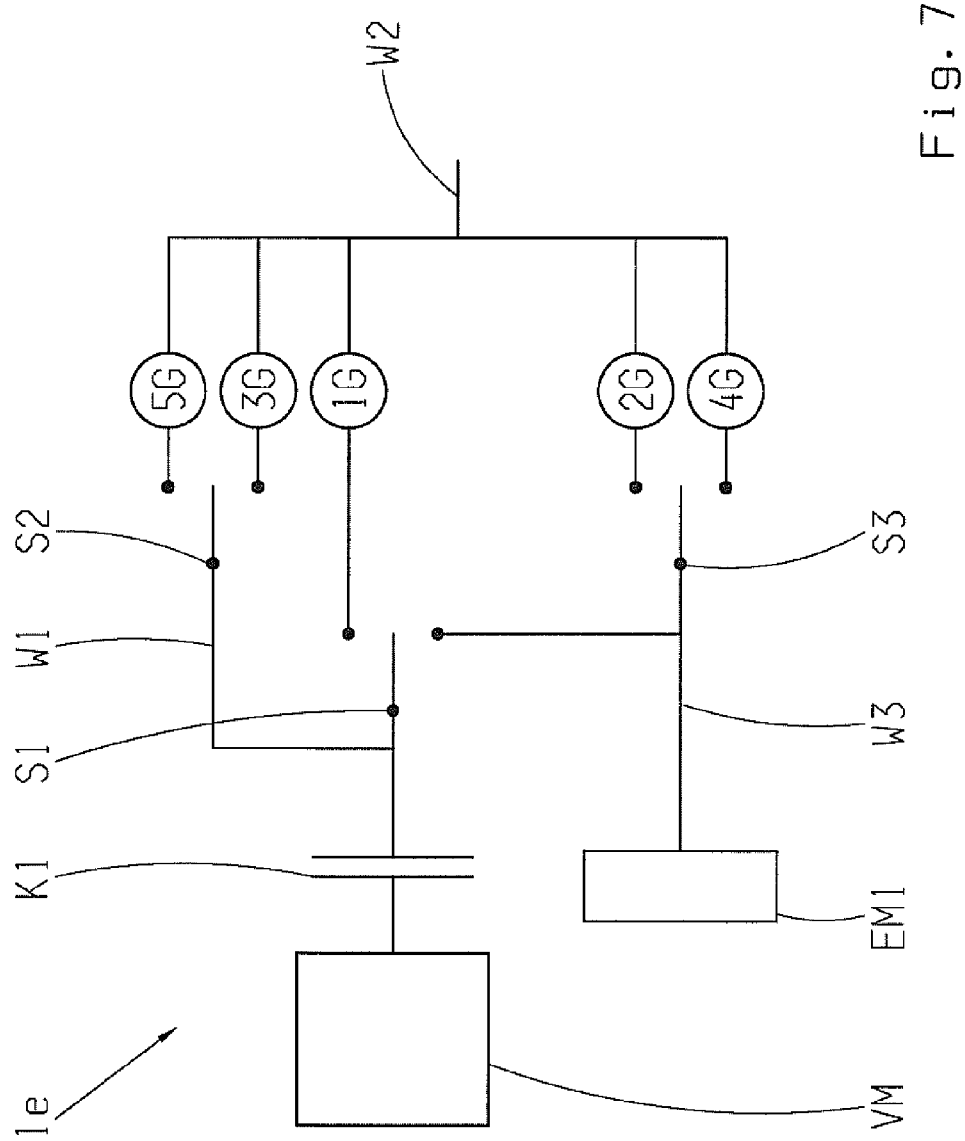
Figure 9:
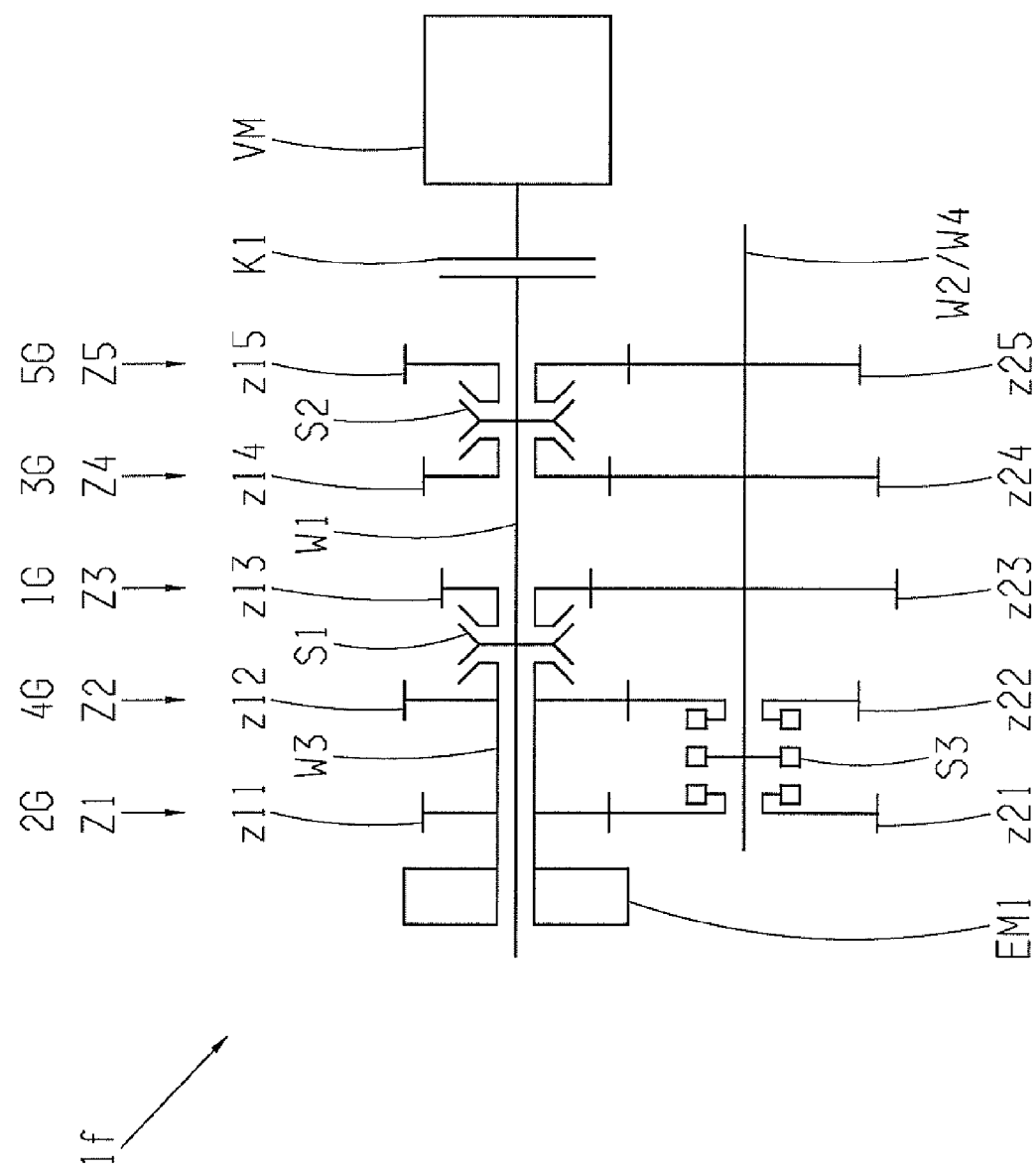
Figure 10:
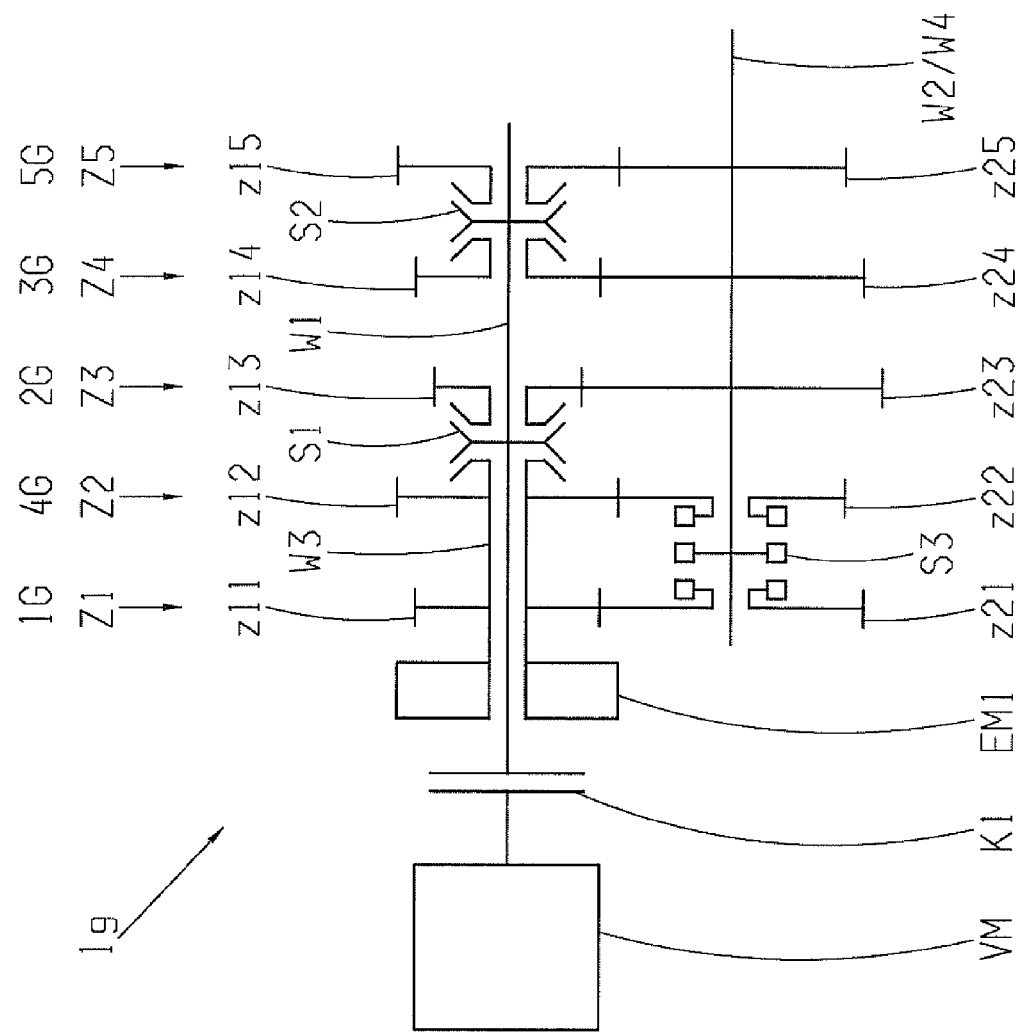
Figure 12:
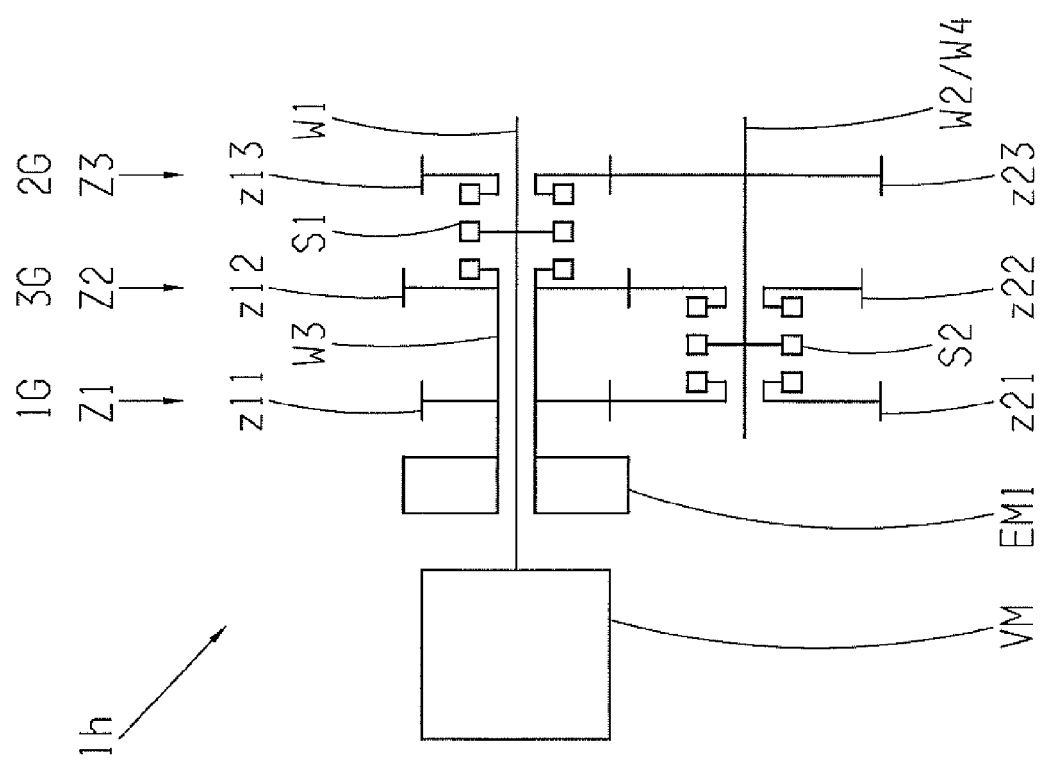
Figure 14:
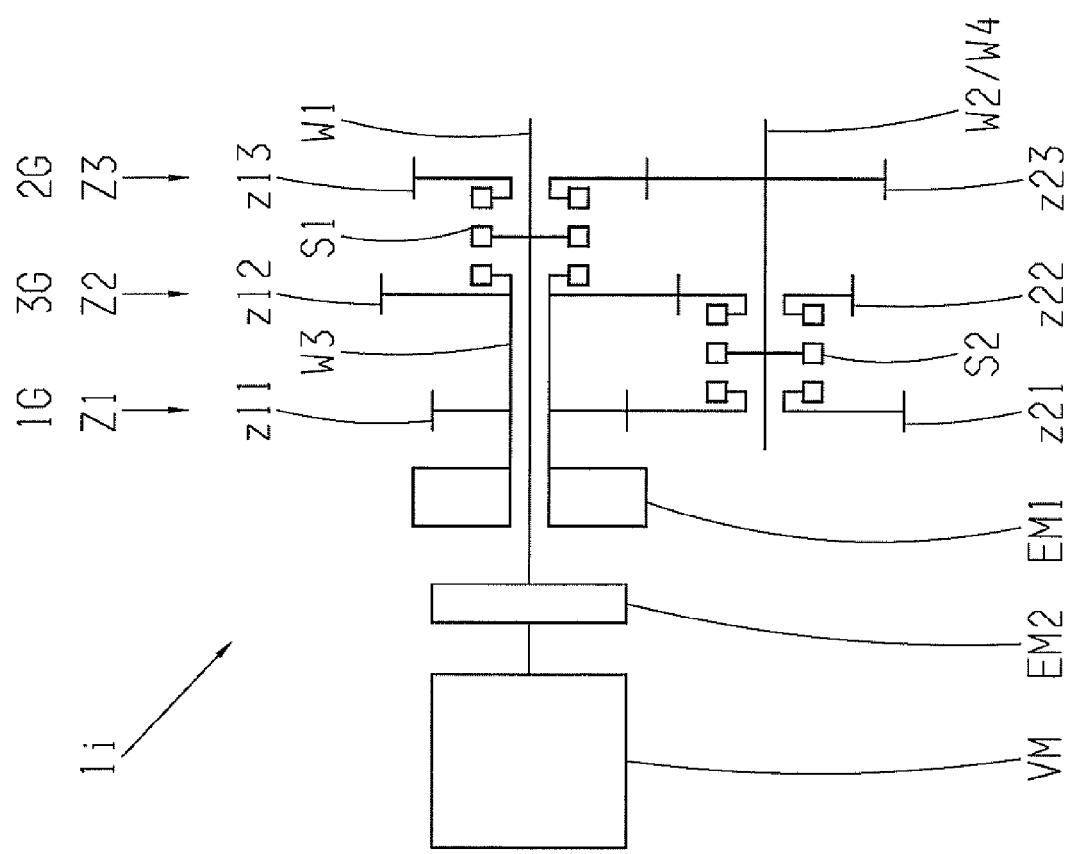
Figure 15:
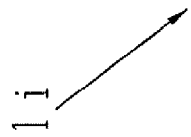
Figure 16:
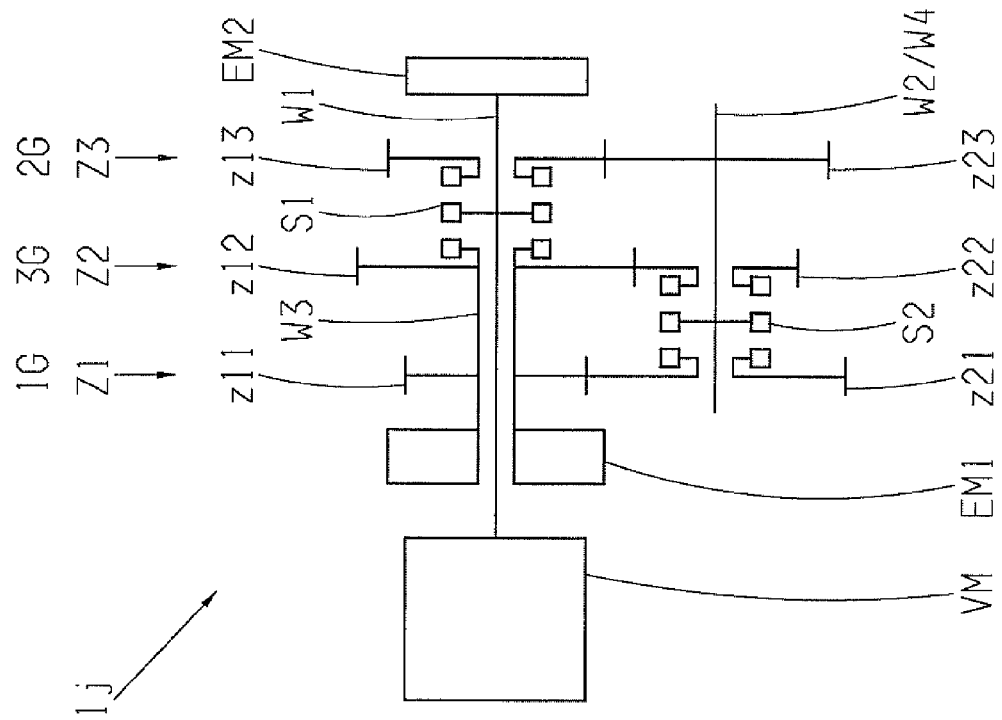
Figure 17:
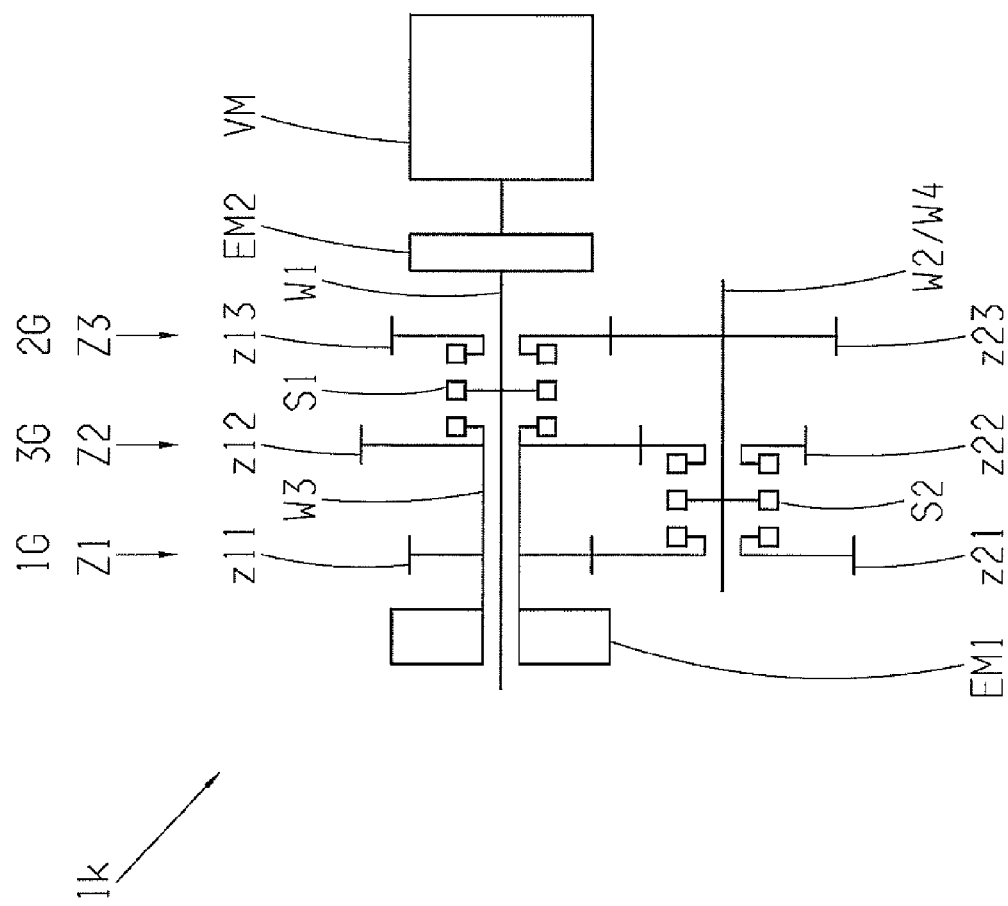
Figure 18:
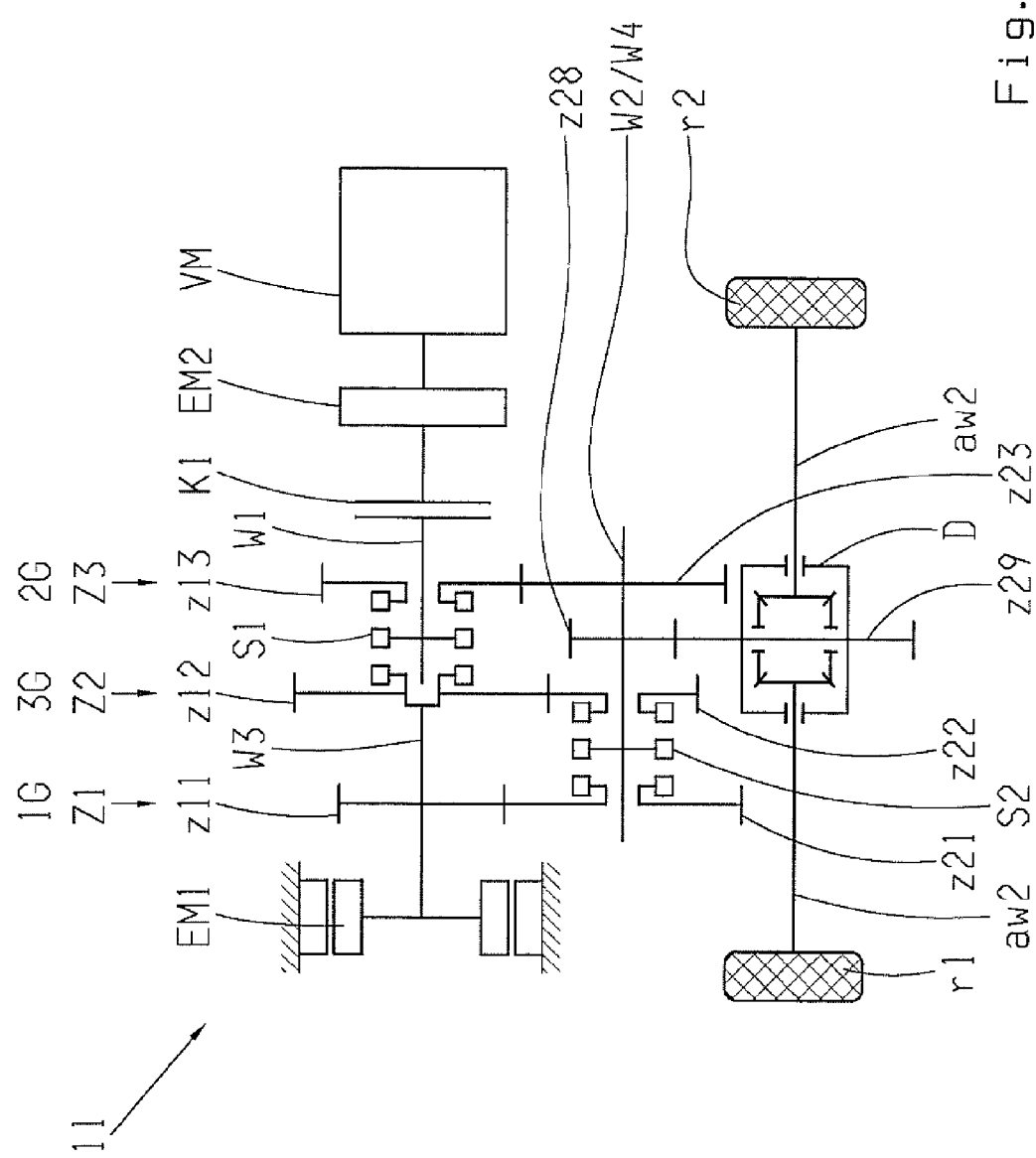

For further clarification of the invention, drawings of other embodiment examples accompany the description. They show:

FIG. 1 a first hybrid drive structure having an automated conventional transmission, having an internal combustion engine and a first electric motor, having coaxial inputs and outputs with six forward gears and one reverse gear, and having irregularly distributed gear shifting devices disposed on an input plane and an output plane, as well as on a layshaft plane;

FIG. 2 a gear ratio table of the hybrid drive structure according to FIG. 1, having a gear ratio sequence and an exemplary transmission ratio series and gradation;

FIG. 3 a second hybrid drive structure having an automated conventional transmission, having gear shifting devices disposed exclusively on an input and output plane;

FIG. 4 a third hybrid drive structure having an automated conventional transmission, having uniformly distributed gear shifting devices disposed on an input and output plane, as well as on a layshaft plane;

FIG. 5 a fourth hybrid drive structure having an automated conventional transmission, having a coaxial input and output with five forward gears and one reverse gear;

FIG. 6 a fifth hybrid drive structure having an automated conventional transmission, having an axially offset input and output with five forward gears and one reverse gear;

FIG. 7 a schematic depiction of a shifting topology of the hybrid drive structure according to FIG. 6;

FIG. 8 a gear ratio table of the hybrid drive structure according to FIG. 6 and FIG. 7, with a gear ratio sequence;

FIG. 9 a sixth hybrid drive structure having an automated conventional transmission, having an internal combustion engine, and an electric motor disposed opposite one another;

FIG. 10 a seventh hybrid drive structure having an automated conventional transmission, having a gear ratio sequence modified with respect to the hybrid drive structure of FIG. 6;

FIG. 11 a gear ratio table of the hybrid drive structure from FIG. 10, with the gear ratio sequence;

FIG. 12 an eighth hybrid drive structure having an automated conventional transmission, having an axially offset input and output with three forward gears and one reverse gear, and without a start-up clutch;

FIG. 13 a gear ratio table of the hybrid drive structure according to FIG. 12, with a gear ratio sequence;

FIG. 14 a ninth hybrid drive structure having an automated conventional transmission, having a second electric motor, connected successively in a series with an internal combustion engine;

FIG. 15 a gear ratio table of the hybrid drive structure according to FIG. 14 with a gear ratio sequence;

FIG. 16 a tenth hybrid drive structure having an automated conventional transmission, having a second electric motor, disposed opposite the internal combustion engine;

FIG. 17 an eleventh hybrid drive structure having an automated conventional transmission, having a second electric motor disposed opposite a first electric motor; and FIG. 18 a twelfth hybrid drive structure having an automated conventional transmission, in which the two transmission input shafts are disposed coaxially as well as axially behind one another.

FIGS. 1, 3, 4, 5, 6, 9, 10, 12, 14, 16, 17, and 18 show, accordingly, twelve hybrid drive structures 1a-1l, each having an automated conventional transmission (AMT hybrid), with which the two transmission input shafts can be connected in a functional manner to one another by means of a gear shifting device, and with which a transmission gear can be actuated in a second shifting setting with the same gear shifting device. Aside from the embodiment example according to FIG. 18, with the other transmissions one of the two transmission input shafts is disposed, at least in part, coaxially and radially above the other input shaft. With the variation according to FIG. 18, the two transmission input shafts, in contrast, are disposed such that they are coaxially and axially adjacent to one another.

FIGS. 2, 8, 11, 13, 15 show tables of associated gear ratio. FIG. 7 shows a shifting topology fundamental to all hybrid drive structures 1a-1l. For purposes of simplification, the same reference symbols are used for comparable components in the figures.

Accordingly, a first hybrid drive structure 1a shown in FIG. 1 comprises seven gear set planes Z1-Z7, for providing six forward gears 1G-6G, and one reverse gear RG. An internal combustion engine VM, or its crankshaft, respectively, can be connected to a transmission input shaft W1, which passes through the hybrid drive structure 1a, by means of a start-up element K1 designed as a motor clutch or, respectively, a start-up clutch. A transmission output shaft W2 is disposed axially behind this. The first transmission input shaft W1 is coaxially encompassed by a second transmission input shaft W3, designed as a hollow shaft, to which an electric motor EM1, or the rotor thereof, is attached. A layshaft W4 is located axially parallel thereto.

The first gear set plane Z1, at the transmission input end, is formed by means of a fixed gear z11, connected non-rotationally to the hollow shaft W3, and an idler gear z21 which engages therewith, rotationally disposed on the layshaft W4. The idler gear z21 can be connected non-rotationally to the layshaft W4 in a first shifting setting by means of a gear shifting device S4, which can be actuated from both sides, designed as an un-synchronized jaw clutch coupling. The gearwheel pair z11/z21 of the gear set plane Z1 is configured for a second gear 2G.

The second gear set plane Z2 comprises a fixed gear z12 disposed on the hollow shaft W3 and an idler gear z22 resting on the layshaft W4, which can be connected non-rotationally to the layshaft W4 with the fourth shifting device S4 in a second shifting setting. The gearwheel pair z12/z22 of the gear set plane Z2 is configured for a fourth gear 4G.

The transmission input shaft W1 extends from the hollow shaft W3 at the level of a first gear shifting device S1 disposed thereon, which can be actuated from both sides, configured as a synchronization device. The hollow shaft W3, and thereby the electric motor EM1, can be functionally connected to the transmission input shaft W1 by means of the shifting device S1 in a first shifting setting.

The third gear set plane Z3 is designed as a reverse gear RG. It comprises an idler gear z13 disposed on the transmission input shaft W1, which can be non-rotationally connected to the transmission input shaft W1 with the first shifting device S1 in a second shifting setting. The idler gear z13 is engaged with a rotationally supported intermediate gearwheel zR3 for reversing the rotational direction, which engages in turn with an associated fixed gearwheel z23 disposed on the layshaft W4.

The fourth gear set plane Z4 comprises an idler gear z14 of the transmission input shaft W1, which can be non-rotationally connected to the transmission input shaft W1 in a first shifting setting by means of a second gear shifting device S2, designed as a synchronization device that can be actuated from both sides, and an associated fixed gearwheel z24 of the layshaft W4. This gearwheel pair z14/z24 forms a gear ratio for a first gear 1G.

The fifth gear set plane Z5 is formed by an idler gear z15 that can be connected in a rotationally fixed manner to the transmission input shaft W1 by means of a shifting device S2 in a second shifting setting, and a fixed gear z25 on the layshaft W4 engaging therewith. The gearwheel pair z15/z22 forms a gear ratio for a third gear 3G.

The sixth gear set plane Z6 comprises an idler gear z16 of the transmission input shaft W1, which, by means of a third gear shifting device S3 designed as a synchronization device that can be actuated from both sides, can be connected in a rotationally fixed manner to the transmission input shaft W1 in a first shifting setting, and an associated fixed gear z26 of the layshaft W4. This gearwheel pair z16/z26 forms a gear ratio for a sixth gear 6G.

In a second shifting setting, the shifting device S3 establishes a direct connection between the transmission input shaft W1 and the transmission output shaft W2. This direct connection represents a fifth gear 5G as a direct gear.

The seventh gear set plane Z7 is designed as an output constant. It comprises a fixed gear z17 connected to the transmission output shaft W2, which is engaged with a fixed gear z27 connected to the layshaft W4.

FIG. 2 shows a gear ratio table of the hybrid drive structure 1a. The table is to be read from left to right for internal combustion engine gears (column 1, gear sequence VM), and from right to left for separate electric, and electric-internal combustion engine, coupled gears (column 8, gear sequence EM). With the internal combustion engine gears, the internal combustion engine VM acts as an output via a gear set plane Z1-Z6 entered in the first column behind the respective gear. In the second column, a gear ratio i is entered, and in the third column, an associated gear ratio transition is entered, by way of example, from which, in this case, an overall range i_ges=7.05 is the result. The fifth gear 5G has the ratio i=1 as a direct gear; the sixth gear 6G is configured as an overdrive. The transmission ratio range is geometrically configured with nearly constant steps, such that the difference increases the greatest speeds between the gears with successive gears. In columns S1-S4, the respective shifting settings "li"=left, or "re"=right for the gear shifting devices S1, S2, S3, S4 is given, wherein whether the internal combustion engine VM, the electric motor EM1, or both are to be activated, must be taken into account in each case.

The internal combustion engine gear sequence begins with the first gear 1G, which connects, via the synchronization device S2, the gearwheel z14 of the gear set plane Z4 to the transmission input shaft W1, and thereby to the internal combustion engine, after engaging the start-up clutch K1 in a force locking manner. The force flow runs to the transmission output shaft W2 via the layshaft W4 and the output constant Z7. The first gear 1G is a purely internal combustion engine gear.

The second gear 2G can be selected as a purely electric gear or as a coupled gear. Accordingly, the electric motor gear sequence begins at the second separate electric gear 2G, which connects, by means of the jaw clutch coupling S4, the gearwheel z21 of the gear set plane Z1 to the layshaft W4, and thereby to the electric motor EM1. The force flow runs in turn, as is the case with all gears aside from the direct gear, to the transmission output shaft W2 via the layshaft W4 and the output constant Z7. Alternatively, the second gear 2G can be actuated by both drive motors VM, EM1. For this, the synchronization device S1 also connects the transmission input shaft W1 to the hollow shaft W3, such that the two drive torques are combined in an overlapping manner.

Subsequently, the third gear 3G is a purely internal combustion engine gear, the fourth gear 4G is selectively an electric or coupled gear, the fifth gear 5G (direct gear) and the sixth gear 6G are internal combustion engine gears. The reverse gear RG can be actuated either via the synchronization device S1 in an internal combustion engine mode, or via the jaw clutch coupling S4 and a rotational direction reversal of the electric motor EM1, in a purely electric mode. With this shift pattern, the second gear 2G and the fourth gear 4G can be operated selectively with support from the electric drive or in a purely electric mode. Driving in reverse by means of electric power is possible. Because there are no consecutive coupled gearings, a driving power support is continuously possible by means of a suitable actuation of a driving power support via the respective other drive source while shifting gears.

In the following, the respective substantial differences of individual AMT hybrid variations shall be explained.

FIG. 3 shows a hybrid drive structure 1b that is comparable to that in FIG. 1. In this case, the shifting device S4 is disposed on the hollow shaft W3 instead of on the layshaft W4. All shifting elements S1-S4 therefore are located on the input and output planes W1/W2/W3. There are only fixed gears z21, z22, z23, z24, z25, z26, z27 disposed on the layshaft W4.

FIG. 4 shows a comparable hybrid drive structure 1c, in which, however, there are, in each case, two shifting devices S1 and S3, or S2 and S4 disposed on the input and output planes W1/W2/W3, or on the layshaft W4, respectively. The shifting elements S1-S4 are thus uniformly distributed on the input and output planes W1/W2/W3 and on the layshaft W4. For this, a jaw clutch coupling S4 and a synchronized shifting element S2 are disposed on the layshaft W4, while there are two synchronized shifting elements S1 and S3 present on transmission input shaft W1. In another design based on FIG. 4, not shown, the jaw clutch coupling S4 is not disposed on the layshaft W4, but instead, on the second transmission input shaft W3, in accordance with FIG. 3.

FIG. 5 shows a hybrid drive structure having five forward gears 1G-5G, and without a reverse gear. The fourth gear 4G is a direct gear, actuated by means of a connecting of the transmission input shaft W1 to the output shaft W2 by means of the shifting element S2. There are four gear set planes Z1-Z4 for forward gears and one output constant Z5. Driving in reverse is only possible in an electric mode (plug-in hybrid). In another design based on FIG. 5, not shown, the jaw clutch coupling S3 is not disposed on the layshaft W4, but instead on the second transmission input shaft W3, in a manner analogous to the configuration of the jaw clutch coupling S4 on the transmission input shaft W3 from FIG. 3.

The hybrid drive structures 1a-1d are designed as drive trains having coaxial inputs and outputs. In contrast, the hybrid drive structures 1e-1k described below are designed with axially offset outputs.

FIG. 6 shows in turn a hybrid drive structure 1e, in which the transmission output shaft W2 is designed as a layshaft W2/W4. The hybrid drive structure 1e features five gear set planes Z1-Z5 for five forward gears 1G-5G. A separate reverse gear is not provided. Electric reverse driving is, however, possible. Two synchronized shifting elements S1, S2 are disposed on the transmission input shaft W1, and a jaw clutch coupling S3 is disposed as a gear shifting element on the layshaft W2/W4. In another design based on FIG. 6, not shown, the jaw clutch coupling S3 is not disposed on the layshaft W2/W4, but instead is on the second transmission input shaft W3 in a manner analogous to the configuration of the jaw clutch coupling S4 on the transmission input shaft W3 in FIG. 3.

A shifting topology of the hybrid drive according to FIG. 6 is shown in FIG. 7. On one hand, the shiftable coupling of the electric motor EM1 to the drive train via the hollow shaft W3 and the central shifting element S1, and on the other hand, the shifting from two electric gears—in this case the gears 2G and 4G—via the shifting element S3, is illustrated therein. The output occurs via the output shaft W2. The gears 2G and 4G can thus be operated in a purely electric mode, or be operated coupled, by means of the shifting element S1, to the internal combustion engine VM. The internal combustion engine branch leads in turn to the other gears via the shifting element S1—in this case, the gears 1G, 3G, and 5G, thus to the output W2. The structural concept can be transferred in a logical manner to the other hybrid drive structures 1*a*-1*k*. This is made clear by a comparison of the associated gear ratio table for the hybrid drive structure 1*e* in FIG. 8 to the gear ratio table for the hybrid drive structure 1*a* in FIG. 2. The gear ratio table in FIG. 8, the textual information of which is expressly the subject matter of the description, illustrates the described gear ratio sequence, primarily with regard to the shifting settings of the shifting elements S1, S2 and S3.

A hybrid drive structure 1*f* shown in FIG. 9 illustrates the possibility for an alternative configuration of the hybrid drive sources, the internal combustion engine VM, and the electric motor EM1, in a configuration having an axially offset output. The internal combustion engine VM and the associated start-up clutch K1 are disposed axially opposite the electric motor EM1. Moreover, the gear set corresponds to the hybrid drive structure 1*e* of FIG. 6, to the description of which reference is made. In another design based on FIG. 9, not shown, the jaw clutch coupling S3 is not disposed on the layshaft W2/W4, but instead is disposed on the second transmission input shaft W3, in a manner analogous to the configuration of the jaw clutch coupling S4 on the transmission input shaft W3 in FIG. 3.

FIG. 10 shows a hybrid drive structure 1*g*, having a substantially identical structure to the hybrid drive structure 1*e* of FIG. 6 other than having a modified gear sequence. The only difference is that the configurations of the first gear 1G and the second gear 2G are exchanged. The gearwheels of the first gear 1G are axially flush with the electric motor EM1 in the hybrid drive structure 1*g*. This becomes apparent through a comparison of the associated shifting pattern in FIG. 11 to the shifting pattern in FIG. 8, and shows that the gears can be arbitrarily distributed on the existing gearwheel pairs, with the constraint that coupled gears should not be adjacent to one another in order to enable a full driving power fulfillment during a shifting of gears by means of the other respective power source VM, or EM1, respectively. With the hybrid drive structure 1*g*, the electric, or respectively, the coupled gears are even separated by two gear steps. The textual content in FIG. 8 is also a component of the description. In another, not shown, design based on FIG. 10, the jaw clutch coupling S3 is not disposed on the layshaft W2/W4, but instead on the second transmission input shaft W3, in a manner analogous to the configuration of the jaw clutch coupling on the transmission input shaft W3 in FIG. 3.

FIG. 12 shows a hybrid drive structure 1*h*, designed as a structurally compact "0K-iSG" hybrid. A start-up element K1 between the internal combustion engine VM and the transmission input shaft W1 is dispensed with. The internal combustion engine VM is connected directly, i.e., such that it is not shiftable, to the transmission input shaft W1, and serves as a purely mechanical range extender. Only three gear set planes Z1, Z2, Z3 are disposed for three forward gears 1G, 2G, 3G, which are shifted by means of three non-synchronized jaw clutch couplings S1, S2. The synchronization during gear shifting occurs as the result of a regulation of the rotational rate of the internal combustion engine VM. The electric motor EM1 starts up the internal combustion engine VM and functions as a start-up element for both forward propulsion and for driving in reverse. If applicable, an additional, not shown, starter generator may be provided in order to also be able to start up the internal combustion engine VM in a driving power supported manner. In another design based on FIG. 12, not shown, the jaw clutch coupling S2 is not disposed on the layshaft W2/W4, but instead on the second transmission input shaft W3, in a manner analogous to the configuration of the jaw clutch coupling S4 on the transmission input shaft W3 from FIG. 3.

FIG. 13 shows a gear ratio table for the hybrid drive structure 1*h* according to FIG. 12. The electric motor EM1 can be operated as a generator without a flow force to the output W2 by means of a connection of the electric motor EM1 to the internal combustion engine VM via the shifting setting "li" of the shifting device S1, for charging an energy storage device, in particular a vehicle battery, or for supplying components in the vehicle electrical system with energy. By activating the shifting element S2=li, a purely electric start-up in first gear 1G is possible. Through additional activation of the internal combustion engine VM by means of the shifting setting S1=li, a coupled first gear 1G is actuated. The second gear G2 is a pure internal combustion engine gear. The third gear 3G, in turn, can be operated in a purely electrical manner, or a coupled, internal combustion engine-electric motor, mode. The purely electrical start-up gear 1G can be used as a reverse gear by means of a rotational direction reversal of the electric motor EM1.

Three other hybrid drive structures 1*i*, 1*j* and 1*k* show an AMT hybrid drive having an expanded electric mode. An additional second electric motor EM2 is disposed therein as a crankshaft starter generator (KSG) on the crankshaft of the internal combustion engine, or on the transmission input shaft W1, connected in a non-shiftable manner to the crankshaft, respectively. The gear set corresponds to the hybrid drive structure 1*h* is shown in FIG. 12.

The second electric motor EM2 serves, on one hand, as a generator, and on the other hand, if applicable, as a motor for starting the internal combustion engine VM. The second electric motor EM2 is preferably configured such that it can reliably generate, when in the generator mode, a necessary mid-range electrical power for supplying the first electric motor EM1 as a traction motor for a stop-and-go operation over a longer period of time. For this, a generator power of the EM2 reduced by a factor of 10 in comparison with the traction power of the electric motor EM1, is sufficient.

In the hybrid drive structure 1*i* shown in FIG. 14, the internal combustion engine VM, the second electric motor EM2, and the first electric motor EM1 are disposed axially behind one another. In another design, not shown, based on FIG. 14, the jaw clutch coupling S2 is not disposed on the layshaft W2/W4, but instead on the second transmission input shaft W3, in a manner analogous to the configuration of the jaw clutch coupling S4 on the transmission input shaft W3 from FIG. 3.

FIG. 15 shows a gear ratio table associated with the hybrid drive structure 1*i*. In a first electric gear 1G, for stop-and-go traffic, for example, the electric traction motor EM1 is supplied with power by means of the generator EM2. The internal combustion engine VM powers the generator EM2 for output, without a force flow connection, such that the input can be operated in a low emission serial hybrid mode. Alternatively, the first gear 1G can also be actuated as a purely electrical gear, supplied by an energy storage device, or in a parallel hybrid mode, as a coupled gear, as has already been described above. For this, the transmission input shaft W1 is connected to the hollow shaft W3 via the shifting element S1. The subsequent second gear 2G is an internal combustion engine gear, the third gear, in turn, is a purely electric gear, or a coupled electric-internal combustion engine actuated gear. The electric first gear 1G can, in turn, be used as a reverse gear by means of a rotational direction reversal of the electric motor EM1.

With the hybrid drive structure 1j shown in FIG. 16, the second electric motor EM2 is disposed at the axially opposite end of the transmission. This configuration represents a simple modular expansion, without structural changes to the hybrid drive structure 1h of FIG. 12. It can be used reasonably, when required, as a result of the restrictions to structural space required in a motor vehicle. In another design, not shown, based on FIG. 16, the jaw clutch coupling S2 is not disposed on the layshaft W2/W4, but instead on the second transmission input shaft W3, in a manner analogous to the configuration of the jaw clutch coupling S4 on the transmission input shaft W3 from FIG. 3.

Furthermore, with the hybrid drive structure 1k shown in FIG. 17, the second electric motor EM2 and the internal combustion engine VM are disposed on opposite ends of the transmission, in a manner comparable to the hybrid drive structure 1f shown in FIG. 9. In another, not shown, design based on FIG. 17, the jaw clutch coupling S2 is not disposed on the layshaft W2/W4, but instead on the second transmission input shaft W3, in a manner analogous to the configuration of the jaw clutch coupling S4 on the transmission input shaft W3 from FIG. 3.

Lastly, FIG. 18 shows a hybrid drive structure 1l having adjacently disposed, both coaxially as well as axially, transmission input shafts W1, W3'. The first transmission input shaft W1 can be driven by an internal combustion engine VM as well as by a second electric motor EM2, and the second transmission input shaft W3' can be driven by means of a first electric motor EM1. Moreover, a start-up clutch K1 is disposed on the first transmission input shaft W1. Furthermore, a gear shifting device S1 is disposed axially between the two transmission input shafts W1 and W3', which can couple, in a functional manner, said two shafts W1, W3' to one another in the left-hand shifting setting according to FIG. 18. In a middle shifting setting, this gear shifting device S1 assumes its neutral setting, while in the right-hand shifting setting, it engages the second gear 2G.

The automated transmission according to FIG. 18 is otherwise substantially identical in its construction to the transmissions according to the embodiment examples in FIGS. 12, 14, 16, 17. It has three gear set planes Z1, Z2, Z3 having idler and fixed gears for three forward gears 1G, 2G, 3G, and a reverse gear implemented by means of an electric motor available for this, by means of a combined layshaft and output shaft W2/W4, disposed axially parallel to the two transmission input shafts W1 and W3'. For this, the first gear G1 and the third gear G3 can be operated in a purely electric mode, while all three forward gears 1G, 2G, 3G, can be operated by means of the internal combustion engine. A second gear shifting device S2, likewise designed as a jaw clutch coupling, is disposed on the layshaft W2/W4 for shifting the gears. In addition, FIG. 18 shows that an output gearwheel z28 is attached to the layshaft W2/W4, which engages with an input gearing z29 on the housing of a differential transmission D. In the known manner, two input shafts aw1, aw2 for two wheels r1, r2 of a motor vehicle extend from this differential transmission D.

The start-up clutch K1 can be dispensed with in a cost and space saving manner in the hybrid drive structure 1l of FIG. 18, insofar as, instead of said start-up clutch K1, a second electric motor EM2 is configured such that said electric motor can drive the first transmission input shaft W1, for synchronizing the second gear 2G, for example.

Alternatively, the second electric motor EM2 can be dispensed with in a cost and space saving manner, if the start-up clutch K1 is present on the first transmission input shaft W1, because the synchronization of the second gear 2G can take place by means of the internal combustion engine VM and a slippage configured start-up clutch K1.

REFERENCE SYMBOL LIST 1a-1l hybrid drive structures
1G-6G forward gears
aw1, aw2 input shafts
EM1 electric motor
EM2 electric motor
D differential transmission
i gear ratio
i_ges gear ratio range
K1 start-up element, start-up clutch, motor clutch
RG reverse gear
r1, r2 vehicle wheel
S1-S4 gear shifting devices
VM internal combustion engine
W1 first transmission input shaft
W2 transmission output shaft, transmission output
W3 second transmission input shaft, hollow shaft
W3' second transmission input shaft
W4 layshaft
Z1-Z7 gear set planes
z11-z17 gearwheels
z21-z29 gearwheels
zR3 gearwheel

The invention claimed is:

1. A hybrid drive for a motor vehicle, comprising:
a first transmission input shaft for connectable to a first internal combustion engine;
a second transmission input shaft, being coaxial to the first transmission input shaft, and connected to a first electric motor;
a plurality of gear set planes for forward gears, the plurality of gear set planes including at least two gear set planes dedicated to the second transmission input shaft, and wherein the remaining gear set planes of the plurality of gear set planes are dedicated to the first transmission input shaft;
a layshaft;
a first gear shifting device and a second gear shifting device, wherein the first gear shifting device connects the first transmission input shaft and the second transmission input shaft in a first shifting setting and selects a transmission gear setting in a second shifting setting; and
a transmission output shaft,
wherein the first transmission input shaft is connectable to the first internal combustion engine directly or via a clutch,
wherein the second gear shifting device is configured as a jaw clutch coupling and is disposed on one of the layshaft and the second input shaft, and
wherein the transmission output shaft is disposed axially parallel to the first transmission input shaft.

2. The hybrid drive according to claim 1, further comprising a second electric motor being on the first transmission input shaft between the internal combustion engine and the first gear shifting device.

3. The hybrid drive according to claim 1, further comprising an output gearwheel being on the transmission output shaft, in a non-rotational manner with respect to the transmission output shaft, and between a gear set plane for a second gear and a gear set plane for a third gear, wherein the output gearwheel engages with a differential transmission.

4. The hybrid drive according to claim 1, wherein the second transmission input shaft is a hollow shaft at least partially encompassing the first transmission input shaft; and
one of a fixed gear and an idler gear is disposed on the second transmission input shaft.

5. The hybrid drive according to claim 1, wherein reversely rotating the first electric motor serves a reverse gear.

6. The hybrid drive according to claim 1, wherein the first electric motor is actuated as a synchronization.

7. The hybrid drive according to claim 1, wherein the first electric motor is actuated as an integrated starter generator for starting the internal combustion engine and as a generator for charging an energy storage device.

8. The hybrid drive according to claim 1, wherein the internal combustion engine and the first electric motor are disposed diametrically opposite one another.

9. The hybrid drive according to claim 1 further comprising third and fourth gear shifting devices, wherein the first transmission input shaft connects to the internal combustion engine via a start-up clutch,
one gear set plane is provided for a reverse gear and one output constant is provided,
five gear set planes are provided for forward gears, of which two gear set planes are dedicated to the second transmission input shaft and the remaining gear set planes are dedicated to the first transmission input shaft,
the first, third, and fourth gear shifting devices are configured as synchronization devices and are disposed on the first transmission input shaft, and
the transmission output shaft is disposed axially behind the first transmission input shaft.

10. The hybrid drive according to claim 1, further comprising third and fourth gear shifting devices, wherein the first transmission input shaft connects to the internal combustion engine via a start-up clutch,
one gear set plane is provided for a reverse gear and one output constant is provided,
five gear set planes are provided for forward gears, of which two gear set planes of the forward gears are dedicated to the second transmission input shaft and the remaining gear set planes are dedicated to the first transmission input shaft,
two of the first, third, and fourth gear shifting devices are configured as synchronization devices and are disposed on the first transmission input shaft,
one of the first, third, and fourth gear shifting devices configured as a synchronization device are disposed on one of the layshaft and the second transmission input shaft, and
the transmission output shaft is disposed axially behind the transmission input shaft.

11. The hybrid drive according to claim 1, further comprising a third gear shifting device, wherein the first transmission input shaft connects to the internal combustion engine via a start-up clutch,
four gear set planes are provided for forward gears, of which a reverse gear is provided by reversely rotating a gear in one of the four gear set planes one output constant is provided, two gear set planes are dedicated to the second transmission input shaft and the remaining of the four gear set planes are dedicated to the first transmission input shaft,
first and third gear shifting devices are configured as synchronization devices and are disposed on the first transmission input shaft, and
the transmission output shaft is disposed axially behind the transmission input shaft.

12. The hybrid drive according to claim 1, further comprising a third gear shifting device, wherein the first transmission input shaft connects to the internal combustion engine via a start-up clutch,
five gear set planes are provided for forward gears, of which two gear set planes are dedicated to the second transmission input shaft and the remaining gear set planes are dedicated to the first transmission input shaft, and a reverse gear is provided reversely rotating a gear in one of the five gear set planes,
the first and third gear shifting devices are configured as synchronization devices and are disposed on the first transmission input shaft,
the transmission output shaft is disposed axially parallel to the first transmission input shaft, and
the layshaft serves as the transmission output shaft.

13. The hybrid drive according to claim 1, further comprising a third gear shifting device, wherein the first transmission shaft connects to the internal combustion engine via a start-up clutch,
the first electric motor and the internal combustion engine are disposed diametrically opposite one another,
five gear set planes are provided for forward gears, of which a reverse gear is provided by reversal of a gear of one of the five gear set planes, two gear set planes are dedicated to the second transmission input shaft, and the remaining gear set planes are dedicated to the first transmission input shaft,
the first and third gear shifting devices are configured as synchronization devices are disposed on the first transmission input shaft,
the transmission output shaft is disposed axially parallel to the first transmission input shaft, and
the layshaft serves as the transmission output shaft.

14. The hybrid drive according to claim 1, wherein the first transmission input shaft connects directly to the internal combustion engine,
three gear set planes are provided for forward gears, of which two gear set planes are dedicated to the second transmission input shaft and the remaining one gear set plane is dedicated to the first transmission input shaft, and a reverse gear is provided by reversely rotating a gear in one of the three gear set planes, and
the layshaft serves as the transmission output shaft.

15. The hybrid drive according to claim 1, wherein the first transmission input shaft is connected directly to the internal combustion engine,
on the end of the transmission facing the internal combustion engine a second electric motor is disposed on the first transmission input shaft,
three gear set planes are provided for forward gears, of which two gear set planes are dedicated to the second transmission input shaft and one gear set plane is dedicated to the first transmission input shaft, and a reverse gear is provided by reversely rotating a gear in one of the three gear set planes, and
the layshaft serves as the transmission output shaft.

16. The hybrid drive according to claim 1, wherein the first transmission input shaft is directly connected to the internal combustion engine,
at the end of the transmission diametrically opposite the internal combustion engine a second electric motor is disposed on the first transmission input shaft,
three gear set planes are provided for forward gears, of which two gear set planes are dedicated to the second transmission input shaft and one gear set plane is dedicated to the first transmission input shaft, and a reverse gear is provided by using an electric motor reversely rotating a gear in one of the three gear set planes, and the layshaft serves as the transmission output shaft.

17. The hybrid drive according to claim 1, wherein the first transmission input shaft is directly connected to the internal combustion engine, at the end of the transmission facing the internal combustion engine a second electric motor is disposed on the first transmission input shaft, the first electric motor and the internal combustion engine are disposed diametrically opposite one another, three gear set planes are provided for forward gears, of which two gear set planes are dedicated to the second transmission input shaft and one gear set plane is dedicated to the first transmission input shaft, and a reverse gear is provided by reversely rotating a gear in one of the three gear set planes, and the layshaft serves as the transmission output shaft.

18. The hybrid drive according to claim 1, wherein an output constant is provided.

19. The hybrid drive according to claim 1, wherein at least one gear set plane is provided for a reverse gear.

20. The hybrid drive according to claim 1, wherein the first shifting device includes a direct gear.

\* \* \* \* \*